United States Patent
Masushige et al.

(10) Patent No.: US 7,523,025 B2
(45) Date of Patent: Apr. 21, 2009

(54) HOST TERMINAL EMULATOR

(75) Inventors: Akinori Masushige, Kawasaki (JP); Masahide Abe, Kawasaki (JP); Takashi Maruyama, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 431 days.

(21) Appl. No.: 10/731,974

(22) Filed: Dec. 10, 2003

(65) Prior Publication Data
US 2004/0122650 A1 Jun. 24, 2004

(51) Int. Cl.
G06G 7/48 (2006.01)
G06F 9/44 (2006.01)
G06F 13/10 (2006.01)
G06F 13/12 (2006.01)
G06F 9/45 (2006.01)
G06F 17/00 (2006.01)
G06F 17/21 (2006.01)
G06F 17/22 (2006.01)
G06F 15/16 (2006.01)
G06F 9/455 (2006.01)
G06T 11/00 (2006.01)

(52) U.S. Cl. .................. 703/6; 703/21; 703/22; 703/24; 703/26; 703/27; 345/468; 709/227; 715/221

(58) Field of Classification Search .............. 703/6, 703/21, 22, 24, 26, 27; 345/468; 709/227; 715/221
See application file for complete search history.

(56) References Cited

U.S. PATENT DOCUMENTS

| | | | | | |
|---|---|---|---|---|---|
| 5,831,607 | A | * | 11/1998 | Brooks | 715/746 |
| 6,008,811 | A | * | 12/1999 | McMillan | 715/769 |
| 6,243,752 | B1 | * | 6/2001 | Butt | 709/227 |
| 2002/0029259 | A1 | * | 3/2002 | Okada | 709/219 |

FOREIGN PATENT DOCUMENTS

JP 6-35855 2/1994

OTHER PUBLICATIONS

Visualizing Terminal Screen: Part II, Support Tool for Visualization, Emulate a character-base simple screen to GUI. Nikkei Open Systems, No. 6, p. 108-119, Sep. 10, 1993. (*Japanese language original with full English translation.*).

* cited by examiner

*Primary Examiner*—Kamini S Shah
*Assistant Examiner*—David Silver
(74) *Attorney, Agent, or Firm*—Greer, Burns & Crain, Ltd.

(57) ABSTRACT

Disclosed is a host terminal emulator installed in a client computer to detect a coordinate at which a non-protecting attribute is set from coordinates in CUI screen data when it is received from a host computer, to generate GUI screen data in which GUI parts corresponding to the non-protecting attribute are set at respective coordinates following the detected coordinate, to correct the GUI screen data so as to transform the GUI parts in response to the coordinate at which the non-protecting attribute is set, and to display a screen based on the corrected GUI screen data on a monitor.

6 Claims, 23 Drawing Sheets

Conceptual rendering of CUI screen

HOST TERMINAL EMULATOR

BACKGROUND OF THE INVENTION

1. Field of the Invention

The present invention relates to a host terminal emulator that is software to make a common computer work as a terminal device for operating a host computer.

2. Prior Art

Conventionally, dealers who use general purpose computers, such as a main frame, as a business-use host computer were able to operate the host computer only through dedicated terminals connected with the host computer. However, more recently, since personal computers generally marketed have become powerful and communication environment has been improved, personal computers can be used as terminals. Therefore, it became unnecessary for dealers to own dedicated terminals.

In order to use a personal computer as a terminal, it is necessary to connect the personal computer with a host computer through a network, and to install a communication control program, which is used for transmitting/receiving data to/from the host computer, and software called a host terminal emulator on the personal computer. The personal computer on which the communication control program and the host terminal emulator are running is called a host terminal.

The host terminal transmits a command inputted by an operator to the host computer. The host computer that received the command performs process in response to the command, transmitting the screen data to the host terminal for updating some or all of contents on the screen to display the result of the process. The host terminal that received the screen data updates some or all of contents displayed on the screen based on the screen data. After finishing a series of updates of the screen, the host terminal stands by until the following command is inputted.

Incidentally, the screen displayed on a conventional host terminal is the simple screen constituted by many characters such as numerals, alphabetic characters, kana, Chinese characters and symbols, and many blanks, i.e., a CUI (Character User Interface) screen. However, a recent host terminal requires a GUI (Graphical User Interface) screen. That is, it is required that data of a CUI screen is displayed as a GUI screen that includes many GUI parts such as a text box.

In addition, the screen data for displaying a CUI screen on the host terminal (it is referred to as CUI screen data) sent from the host computer consists of records each of which includes coordinate value prepared for every coordinate in a text coordinate system defined by a line and the number of characters in a text-based screen, character codes, and attribute information. The attribute information shows the attribute such as a type of field (a protecting field or a non-protecting field), a position of a ruled line, a color of a field, a character type of field (an alphabetic character field, a kana field, a Chinese character field), an initial position of a cursor, etc. Since the CUI screen data was constituted in such a manner, the host terminal emulator could employ any one of two methods to generate the screen data for displaying a GUI screen (it is referred to as GUI screen data) based on CUI screen data.

The first method is to prepare the screen data of GUI screens corresponding to all kinds of the CUI screens, respectively. For example, see Japanese Patent Provisional-Publication No. H06-035855. According to the first method, the host terminal extracts the character string that specifies the kind of CUI screen from CUI screen data, reading the initial data of the GUI screen from a disk corresponding to the extracted character string. Then, the host terminal outputs the GUI screen data in which the other character strings in the CUI screen data are incorporated into the predetermined position in the initial data. According to the first method, the GUI parts can be freely arranged in the GUI screen independently of the attributes and arrangements of the characters in the CUI screen, which increases the visibility of the GUI screen.

The second method is to replace parts that can be GUI parts in a CUI screen by GUI parts one by one. In the second method, the host terminal extracts the coordinates at which the specific attribute was set from the coordinates in the CUI screen data, generating GUI screen data in which the GUI parts corresponding to the specific attribute are set at the extracted coordinates. According to the second method, the host terminal emulator can always generate GUI screen data based on CUI screen data, even if any kinds of CUI screen data are sent from the host computer.

However, according to the first method mentioned above, GUI screen data must be prepared for all kinds of CUI screens that could be outputted. For this reason, when there are the 2000 or more kinds, for example, the preparation of the GUI screen data, i.e., the development of the host terminal emulator, needs huge time and effort.

Moreover, according to the second method mentioned above, if one of the attributes that should make a pair like a non-protecting field attribute and a protecting field attribute does not exist in CUI screen data or it is set at a wrong coordinate, a GUI part may not be appropriately displayed on the GUI screen displayed on the host terminal. Therefore, such a GUI screen reduces visibility on the contrary.

SUMMARY OF THE INVENTION

It is therefore an object of the present invention to provide an improved host terminal emulator, which is capable of operating a client computer as a host terminal that can generate GUI screen data to appropriately display GUI parts on the precondition that parts in a CUI screen are replaced by GUI parts one by one.

For the above object, a host terminal emulator according to a first aspect of the present invention employs the following construction.

That is, the host terminal emulator according to the first aspect of the present invention operates a client computer, which is connected to a monitor for displaying various kinds of screens and to a communication control unit for transmitting/receiving data to/from a host computer, to detect a coordinate at which a predetermined first attribute is set from coordinates in CUI screen data when the communication control unit receives CUI screen data from the host computer, to generate GUI screen data in which GUI parts corresponding to the first attribute are set at the respective coordinates following the detected coordinate, to correct the GUI screen data in response to the coordinate at which the first attribute is set, and to display a screen based on the GUI screen data on the monitor.

With this construction, the GUI screen data will be corrected in response to the coordinate at which the first attribute is set in the CUI screen data, which can prevent inappropriate display of the GUI parts due to the coordinate.

A host terminal emulator according to the second aspect of the present invention operates a client computer, which is connected to a monitor for displaying various kinds of screens and to a communication control unit for transmitting/receiving data to/from a host computer, to detect a coordinate at which a predetermined first attribute is set from coordinates in CUI screen data when the communication control unit receives CUI screen data from the host computer, to generate GUI screen data in which GUI parts corresponding to the first attribute are set at the respective coordinates following the coordinate at which the first attribute is set, to detect a coordinate at which a second attribute corresponding to the first attribute is set from coordinates in the CUI screen data, to correct the GUI screen data in response to the coordinate at which the second attribute is set when a coordinate at which the second attribute is detected, and to display a screen based on the GUI screen data on the monitor.

With this construction, when a coordinate at which the first attribute is set and a coordinate at which the second attribute corresponding to the first attribute are detected in the CUI screen data, the GUI screen data will be corrected in response to the coordinate at which the second attribute is set, which can prevent inappropriate display of the GUI parts due to the coordinate.

A host terminal emulator according to the third aspect of the present invention operates a client computer, which is connected to a monitor for displaying various kinds of screens and to a communication control unit for transmitting/receiving data to/from a host computer, to detect a coordinate at which a predetermined first attribute is set from coordinates in CUI screen data when the communication control unit receives CUI screen data from the host computer, to generate GUI screen data in which GUI parts corresponding to the first attribute are set at the respective coordinates following the coordinate at which the first attribute is set, to detect a coordinate at which a second attribute corresponding to the first attribute is set from coordinates in the CUI screen data, to correct the GUI screen data to transform the GUI parts when a coordinate at which the second attribute is not detected, and to display a screen based on the GUI screen data on the monitor.

With this construction, when a coordinate at which the first attribute is set is detected and a coordinate at which the second attribute corresponding to the second attribute is not detected in the CUI screen data, the GUI screen data will be corrected to transform the GUI parts. This can prevent inappropriate display of the GUI parts due to lack of the second attribute.

DESCRIPTION OF THE ACCOMPANYING DRAWINGS

DESCRIPTION OF THE PREFERRED EMBODIMENTS

Hereafter, an embodiment of the present invention will be described with reference to the drawings.

Figure 1:
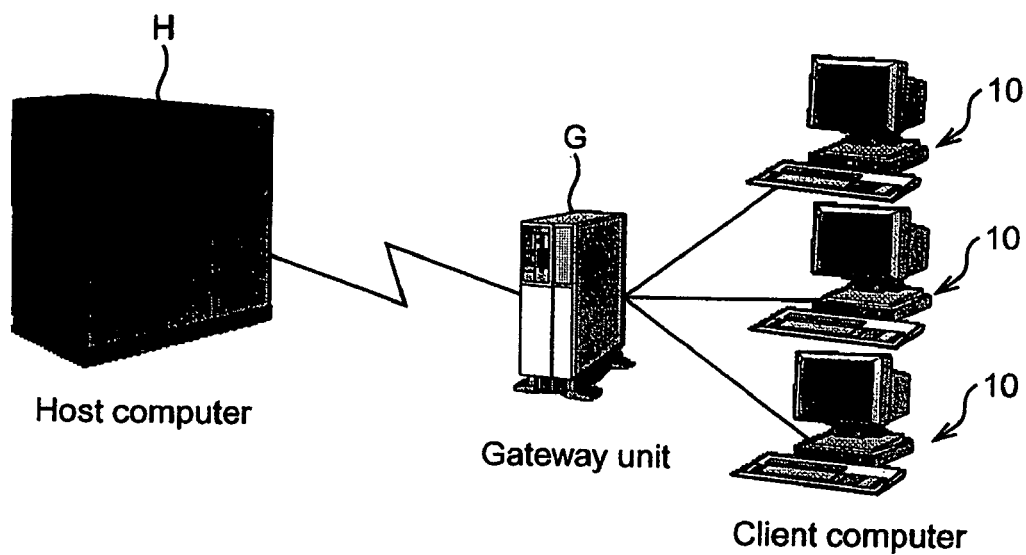
FIG. 1 is a block diagram showing a network to which an embodiment of the present invention is applied.

FIG. 1 is a block diagram showing a network to which the embodiment of the present invention is applied. In the embodiment, a business-use host computer H that is a general purpose computer such as a main frame, is used. The host computer H stores business data. Moreover, when the host computer H accepts a command, it performs operation process corresponding to the command and outputs the screen data for updating some or all of a screen to display a processing result.

The host computer H transmits/receives data to/from a gateway unit G through the vender's own communication architecture. The gateway unit G is connected with many client computers 10 through a network such as a LAN (Local Area Network). The gateway unit G converts the vender's own communication protocol of the host computer H into the TCP/IP (Transmission Control Protocol/Internet Protocol), or carries out the reverse conversion. Specifically, the gateway unit G is a so-called relay server such as an FNA (Fujitsu Network Architecture: Trademark of FUJITSU, LTD.) server, an SNA (Systems Network Architecture: Trademark of IBM) server, and an HNA (Hitachi Network Architecture: Trademark of Hitachi, Inc.) server.

Figure 2:
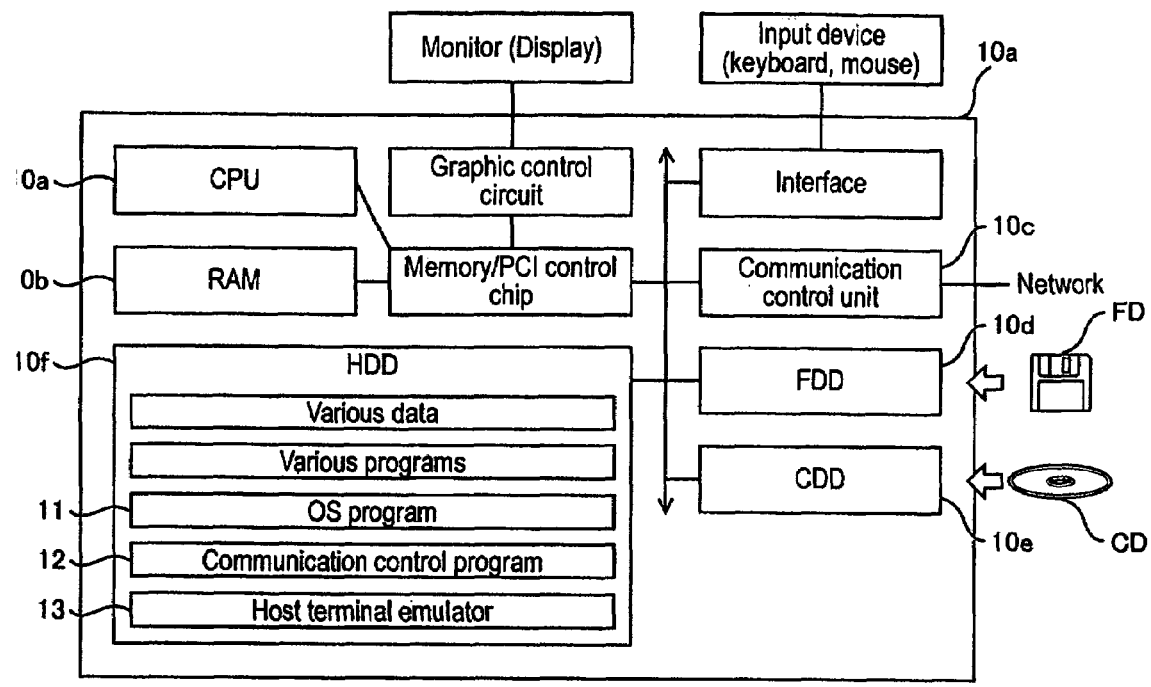
FIG. 2 is a block diagram showing construction of a host terminal.

FIG. 2 is a block diagram showing construction of a client computer 10. The client computer 10 consists of an input device such as a keyboard and a mouse, a monitor for displaying various screens and a main body connected with the input device and the monitor. The main body is provided with various parts of hardware such as a CPU 10a, a RAM 10b, a communication control unit 10c, a flexible disk drive (FDD) 10d, a compact disk drive (CDD) 10e and a hard disk drive (HDD) 10f.

The CPU 10a is the central processing unit that totally controls the parts 10b through 10f of the hardware. The RAM 10b is a memory that temporarily stores the part of the programs and the data that are frequently used by the CPU 10a. The communication control unit 10c is a TAN interface board connected to the LAN to manage transmission/reception of the data to/from the computers connected to the LAN.

The FDD 10*d* are the CDD 10*e* are the drives that read data and programs stored in a computer-readable medium such as a flexible disk FD and a compact disk CD, and that write data and programs in the disks FD and CD. Data and programs read from the disks FD and CD by through the drives 10*d* and 10*e* are installed in the HDD 10*f*.

The HDD 10*f* is an external storage from which various kinds of data and programs are read and to which various kinds of data and programs are written. An operation system (OS) program 11, a communication control program 12 and a host terminal emulator 13 are installed in the HDD 10*f*.

The OS program 11 operates the CPU 10*a* for totally managing hardware and software. The OS program 11 has a function to display a screen on the above-mentioned monitor based on screen data.

The communication control program 12 is a program for transmitting/receiving data to/from the host computer H in the fifth layer of the OSI (Open System Interconnection) reference model. More specifically, the communication control program 12 makes the CPU 10*a* transmit the data received from the function of the host terminal emulator 13 mentioned later to the host computer H, and transmit the data received from the host computer H to the function of the host terminal emulator 13.

The host terminal emulator 13 is software that makes the CPU 10*a* transmit the command inputted by an operator to the host computer H using the function of the communication control program 12, and that makes the CPU 10*a* display a screen based on screen data received from the host computer H through the function of the communication control program 12 on the monitor using the function of the OS program 11. In the following description, the display using the function of the OS program 11 is simply expressed as a display, and the transmission and reception of data using the function of the communication control program 12 are simply expressed as transmission and reception.

Figure 3:
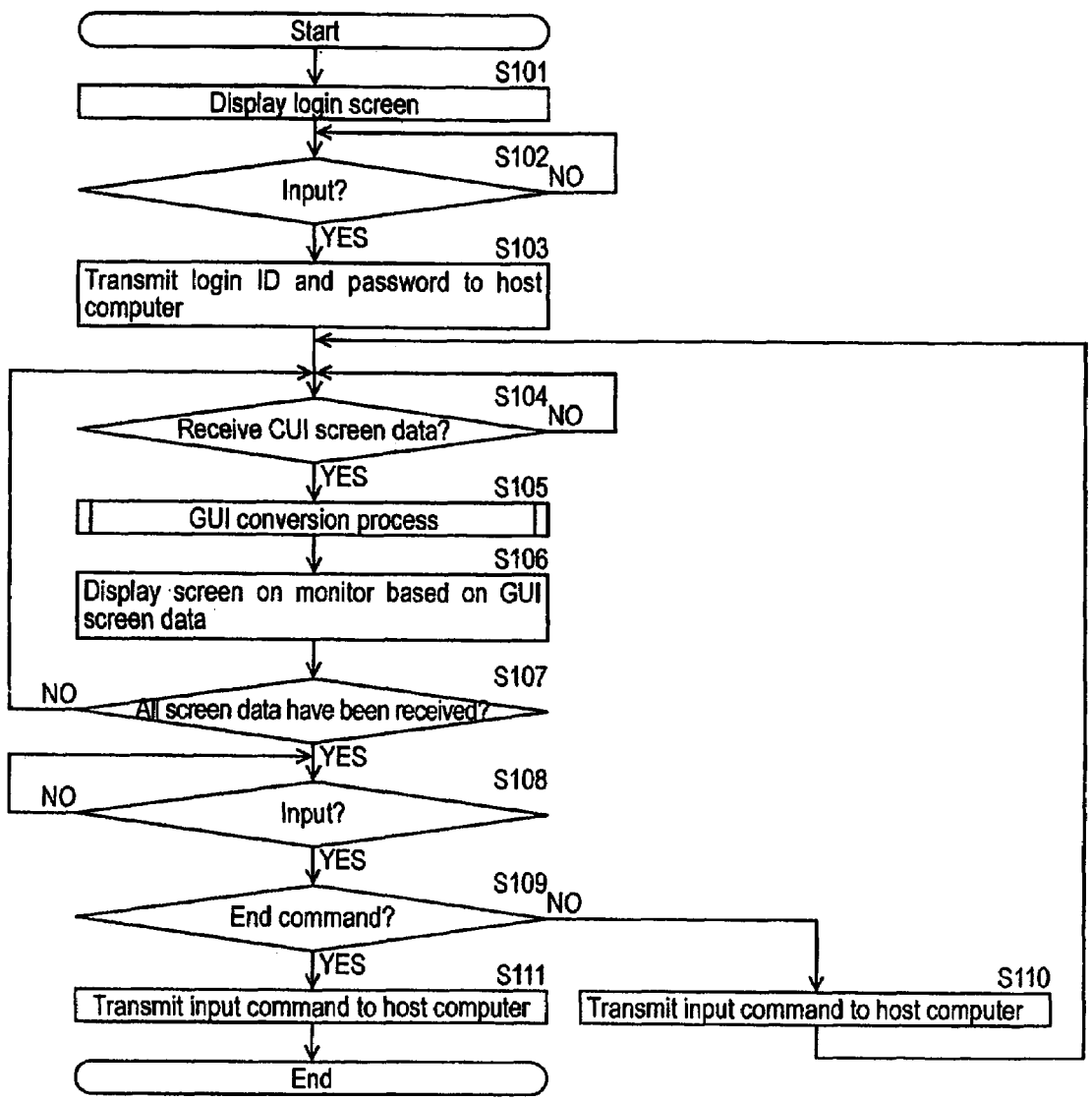
FIG. 3 is a flowchart showing contents of a host terminal emulating process of the embodiment.

When the host terminal emulator 13 is started by an operator, the client computer 10 starts a host terminal emulating process. The client computer 10 on which the host terminal emulating process is running functions as a terminal for operating the host computer H mentioned above. FIG. 3 is a flowchart showing the contents of the host terminal emulating process.

At S101 of the host terminal emulating process, the CPU 10*a* displays a login screen on the monitor based on the login screen data read from the HDD 10*f*.

Next, at S102, the CPU 10*a* stands by until the enter key of the input device is depressed. When the enter key of the input device is depressed, the CPU 10*a* brings the process to S103.

At S103, the CPU 10*a* transmits a login ID and a password that are inputted in the login screen at the time when the enter key was depressed at S102 to the host computer H.

Next, at S104, the CPU 10*a* stands by until it receives the screen data for updating some or all of the screen from the host computer H. The screen data transmitted from the host computer H (it is referred to as CUI screen data) is binary form data consists of records each of which includes coordinate value prepared for every coordinate in a text coordinate system defined by a line and the number of characters in a text-based screen, character codes, and attribute information. For example, assuming that the coordinate value at the upper left corner in the screen (a region in an application window, in fact) is (0, 0) and the coordinate value at the lower right corner is (24, 80), the CUI screen data for updating all screen includes the following records:

(Coordinate(0, 0), Character code, Attribute information),
(Coordinate(1, 0), Character code, Attribute information),
. . .
(Coordinate(24, 80), Character code, Attribute information).

Figure 4:
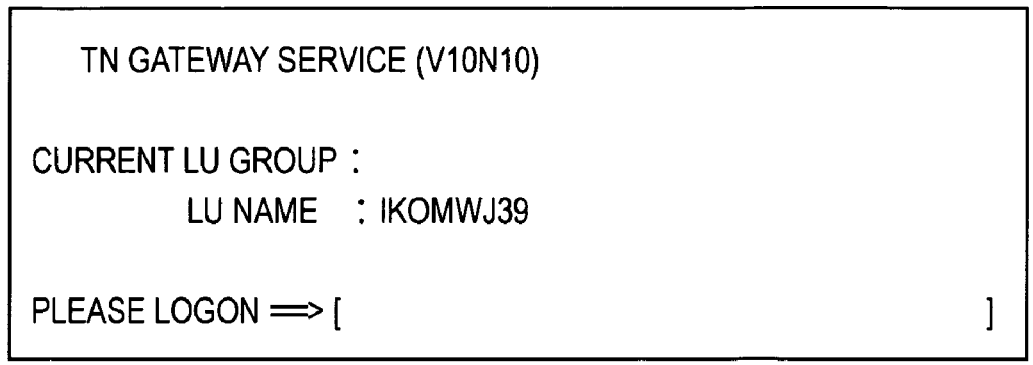
FIG. 4 shows one example of a CUI screen.

The attribute information represents the attribute such as a protecting field, a non-protecting field, a ruled line, a color, an alphabetic character field, a kana field, a Chinese character field, an initial position of a cursor, etc. FIG. 4 shows one example of a screen displayed on a monitor of a conventional dedicated terminal based on CUI screen data for updating all screen (this kind of screen is referred to as a CUI screen). As shown in FIG. 4, the CUI screen is constituted by many characters such as numerals, alphabetic characters, kana, Chinese characters and symbols, and many blanks. Further, the above-mentioned attribute information is set at the several coordinates. In FIG. 4, the protecting field attribute and the non-protecting field attribute are conceptually shown by the symbols "[" and "]". While these attributes are not displayed on the actual screen, they are illustrated for a purpose of description. The region between the coordinate at which the protecting field attribute is set and the coordinate at which the non-protecting field attribute is set is a non-protecting field. The non-protecting field is a region for an operator inputting character strings such as a command. The CPU 10*a* brings the process to S105 when CUI screen data for displaying a CUI screen as shown in FIG. 4 is received from the host computer H.

Figure 5:
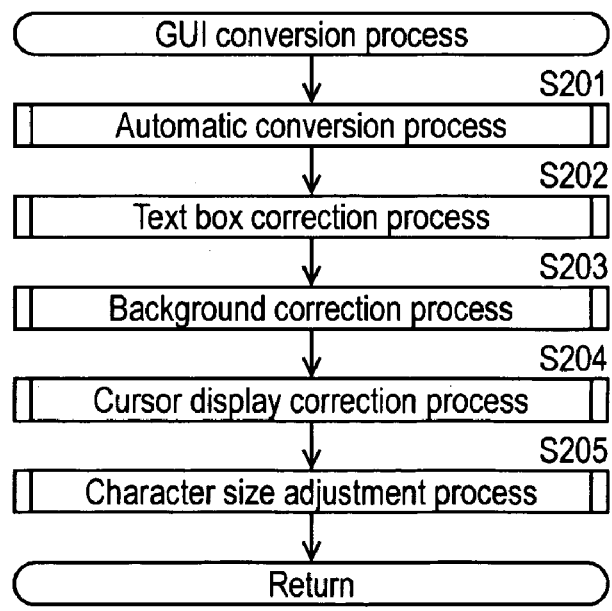
FIG. 5 is a flowchart showing the contents of a GUI conversion subroutine.

At S105, the CPU 10*a* executes a GUI conversion subroutine. FIG. 5 is a flowchart showing the contents of the GUI conversion subroutine.

Figure 6:
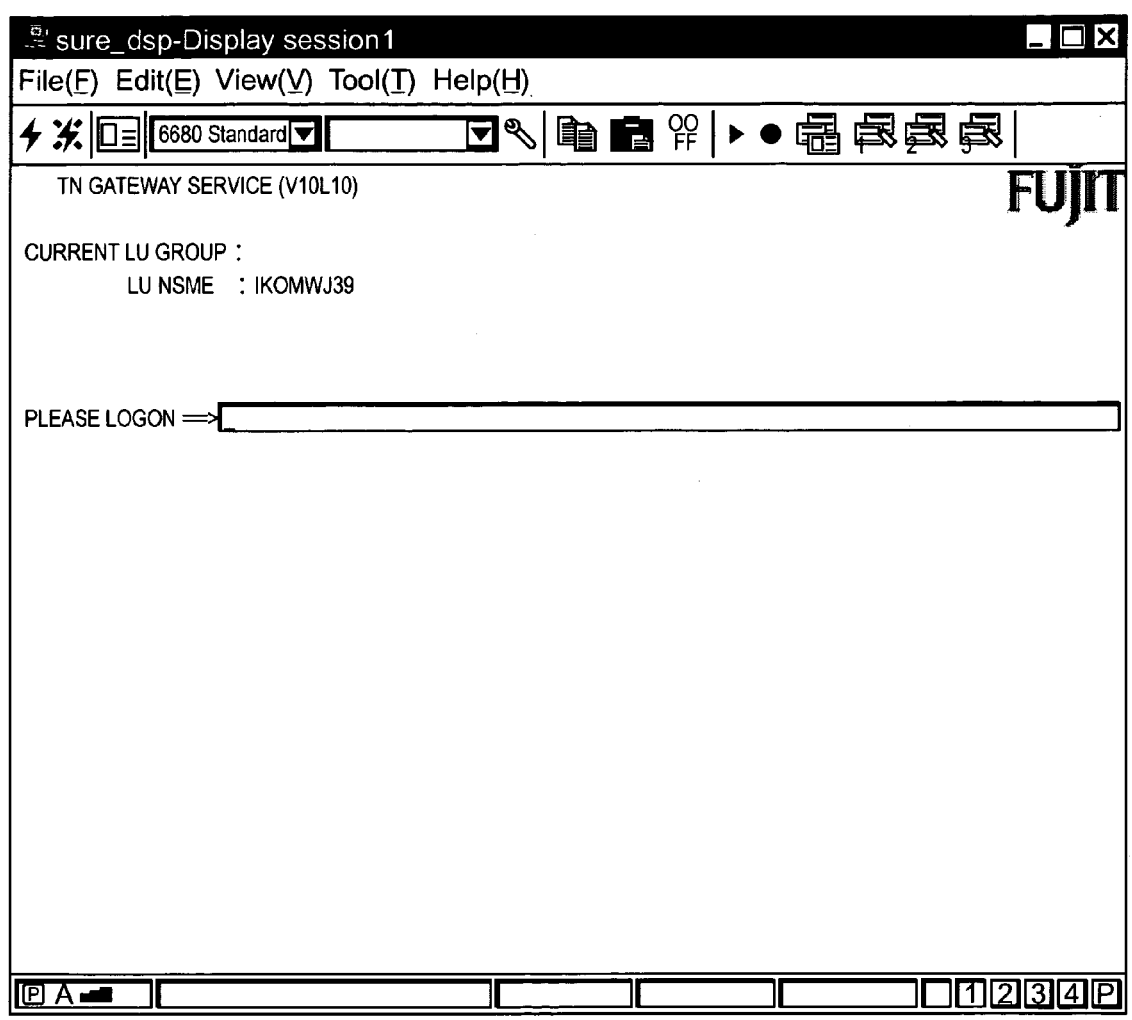
FIG. 6 shows one example of a GUI screen.

At S201 of the GUI conversion subroutine, the CPU 10*a* executes an automatic conversion process. Since the automatic conversion process is well-known, it will be explained briefly. That is, the CPU 10*a* detects the coordinate at which the predetermined attribute is set from the coordinates in the CUI screen data, specifying the GUI part corresponding to the attribute with reference to the table (not shown) recorded on the HDD 10*f*. Then the CPU 10*a* generates the screen data (it is referred to as GUI screen data) in which the GUI parts are set at the detected coordinate. FIG. 6 shows one example of the screen (it is referred to as a GUI screen) displayed on the monitor of the client computer 10 based on the GUI screen data that is generated from the CUI screen data shown in FIG. 4 through the automatic conversion process. As shown in FIG. 6, the text box is shown in the non-protecting field in the CUI screen of FIG. 4. That is, the automatic conversion process sets a start point of a text box at the coordinate having the non-protecting field attribute, and makes the text box extend to the following region after the coordinate. Moreover, an end point of the text box is set at the coordinates having the protecting field attribute. The CPU 10*a* brings the process to S202, after executing the automatic conversion process.

Figure 7:
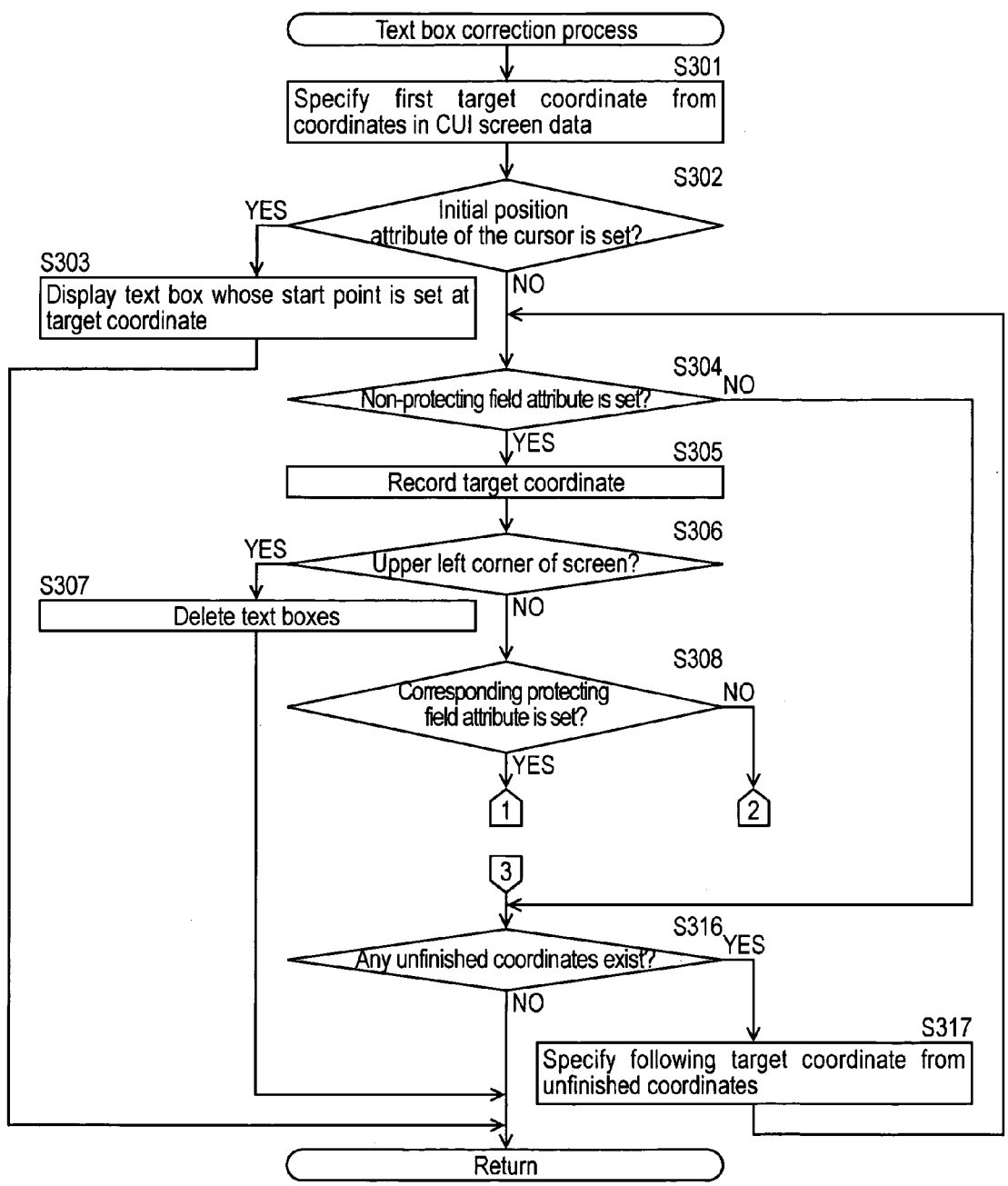
FIGS. 7 and 8 are flowcharts showing the contents of a text box correction subroutine.
Figure 8:
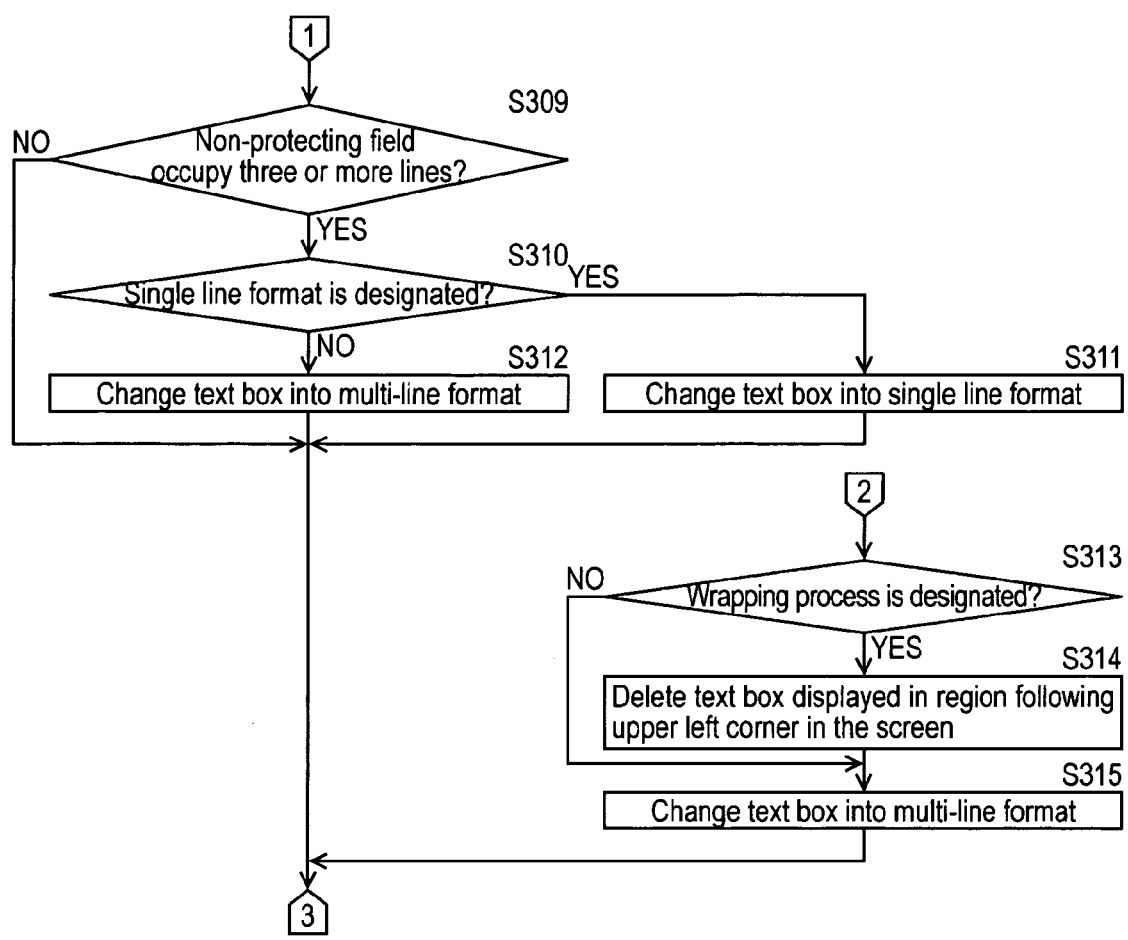

At S202, the CPU 10*a* executes a text box correction subroutine. FIGS. 7 and 8 show a flow chart showing the text box correction subroutine.

At S301 of the text box correction subroutine, the CPU 10*a* specifies a first target coordinate from the coordinates in the CUI screen data.

Next, at S302, the CPU 10*a* distinguishes whether the initial position attribute of the cursor is set at the first target coordinate or not. Then, the CPU 10*a* brings the process to S303, when the initial position attribute of the cursor is set at the first target coordinate.

Figure 9:
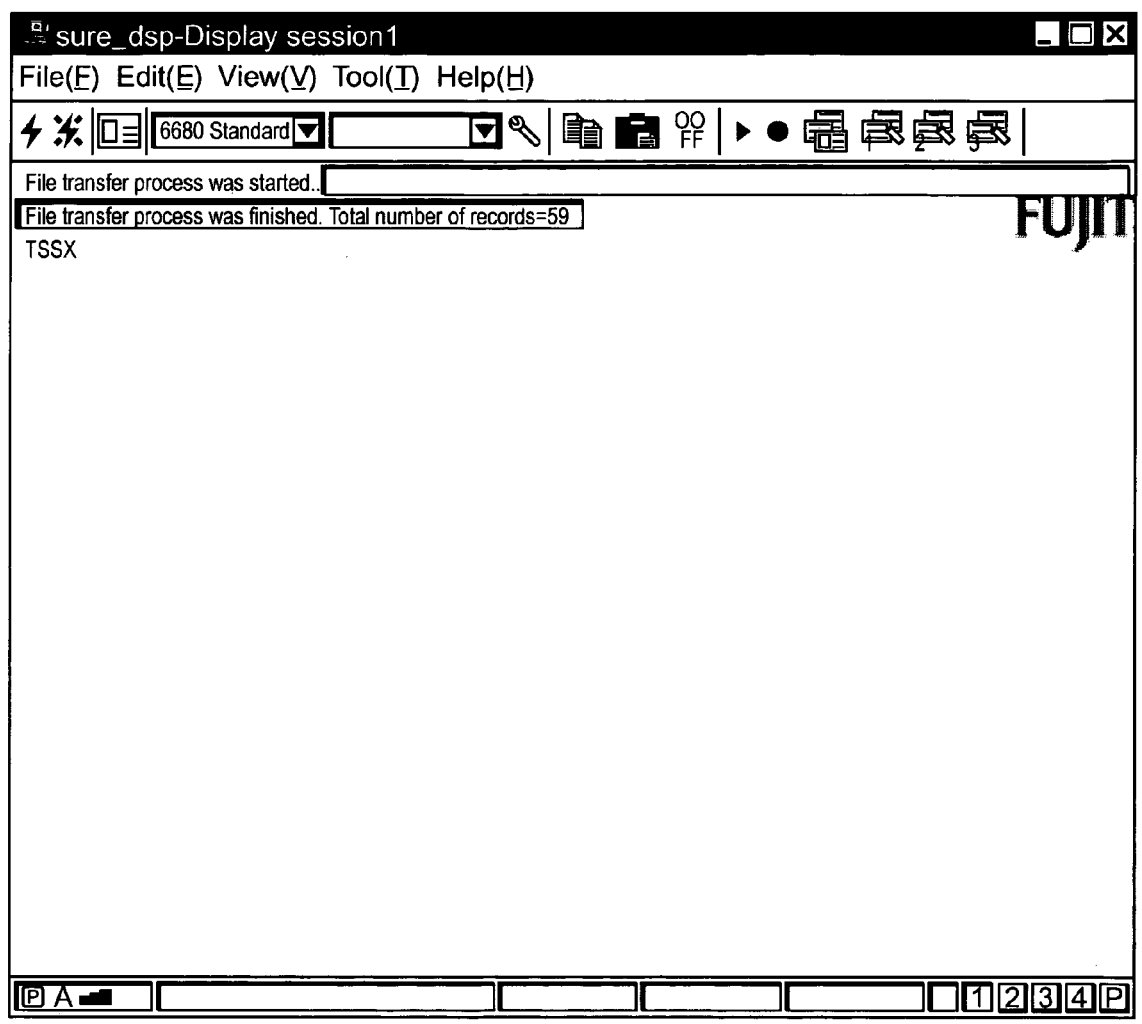
FIG. 9 shows one example of a screen with a cursor at a wrong position.
Figure 10:
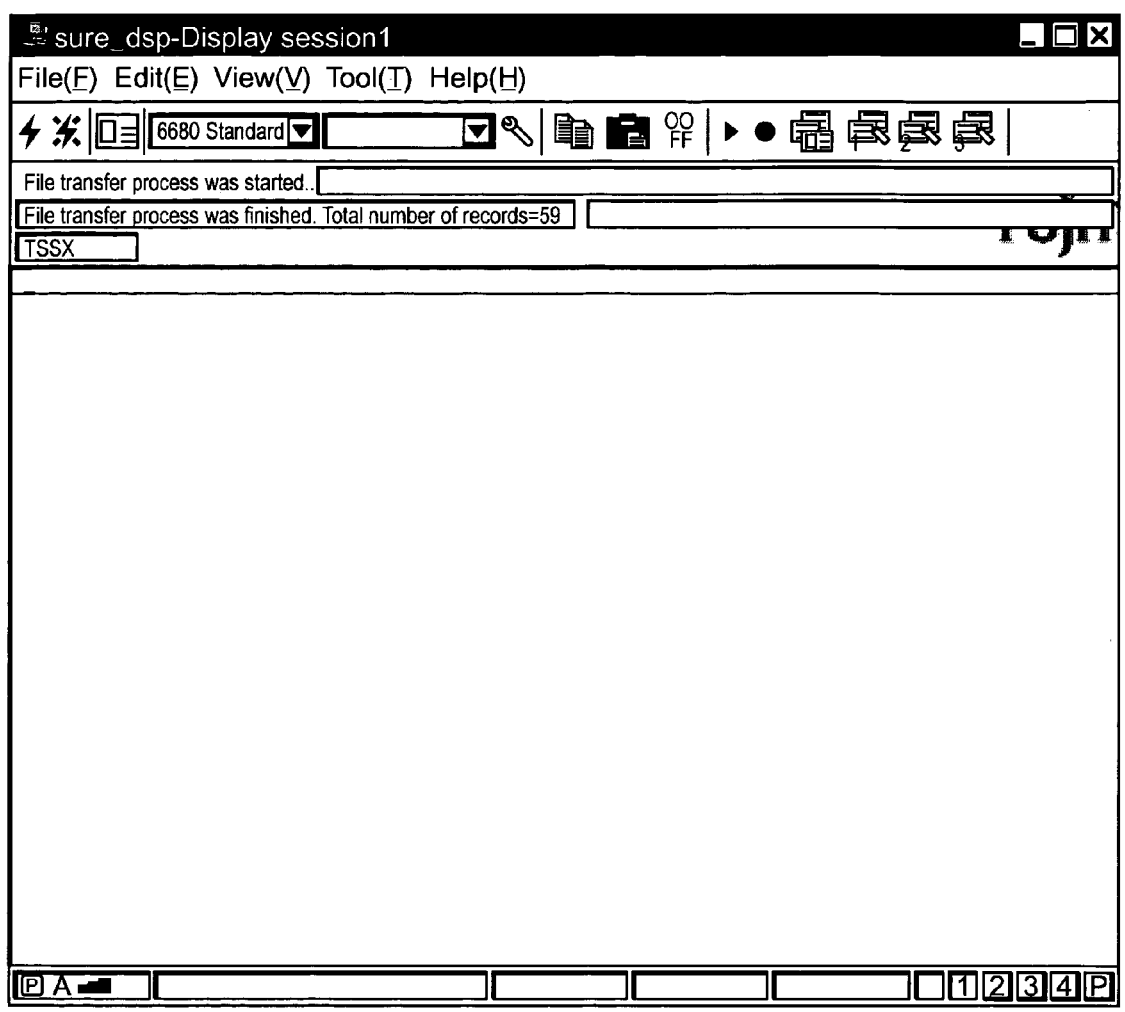
FIG. 10 shows one example of a GUI screen where a text box is arranged at a cursor position.

At S303, the CPU 10*a* changes the setting of the GUI screen data so that a new text box is displayed. The start point of the new text box is set at the target coordinate and the end point thereof is set at the end of the line including the target coordinate. In addition, the host computer may transmit the CUI screen data in which only the initial position attribute of the cursor is set at the first coordinate in order to change the initial position of the cursor. Therefore, a text box is not displayed at the cursor position as shown in FIG. 9 for example, when the process at S303 was not executed. On the other hand, when the process at S303 was executed, a text box with a cursor at the start point thereof is displayed as shown in FIG. 10 for example. After the CPU 10a executes the process at S303, it finishes the text box correction subroutine and brings the process to S203 of the GUI conversion subroutine in FIG. 5.

On the other hand, in S302, when the initial position attribute of the cursor is not set at the first target coordinate, the CPU 10a brings the process to S304.

At S304, the CPU 10a distinguishes whether the non-protecting field attribute is set at the target coordinate or not. Then, the CPU 10a brings the process to S316, when the non-protecting field attribute is not set at the target coordinate. On the other hand, when the non-protecting field attribute is set at the target coordinate, the CPU 10a brings the process to S305.

At S305, the CPU 10a records the target coordinate on the RAM 10b, bringing the process to S306.

At S306, the CPU 10a distinguishes whether the target coordinate is coincident with the coordinates (0, 0) at the upper left corner of the screen. The CPU 10a brings the process to S307, when the target coordinate is coincident with (0, 0).

Figure 11:
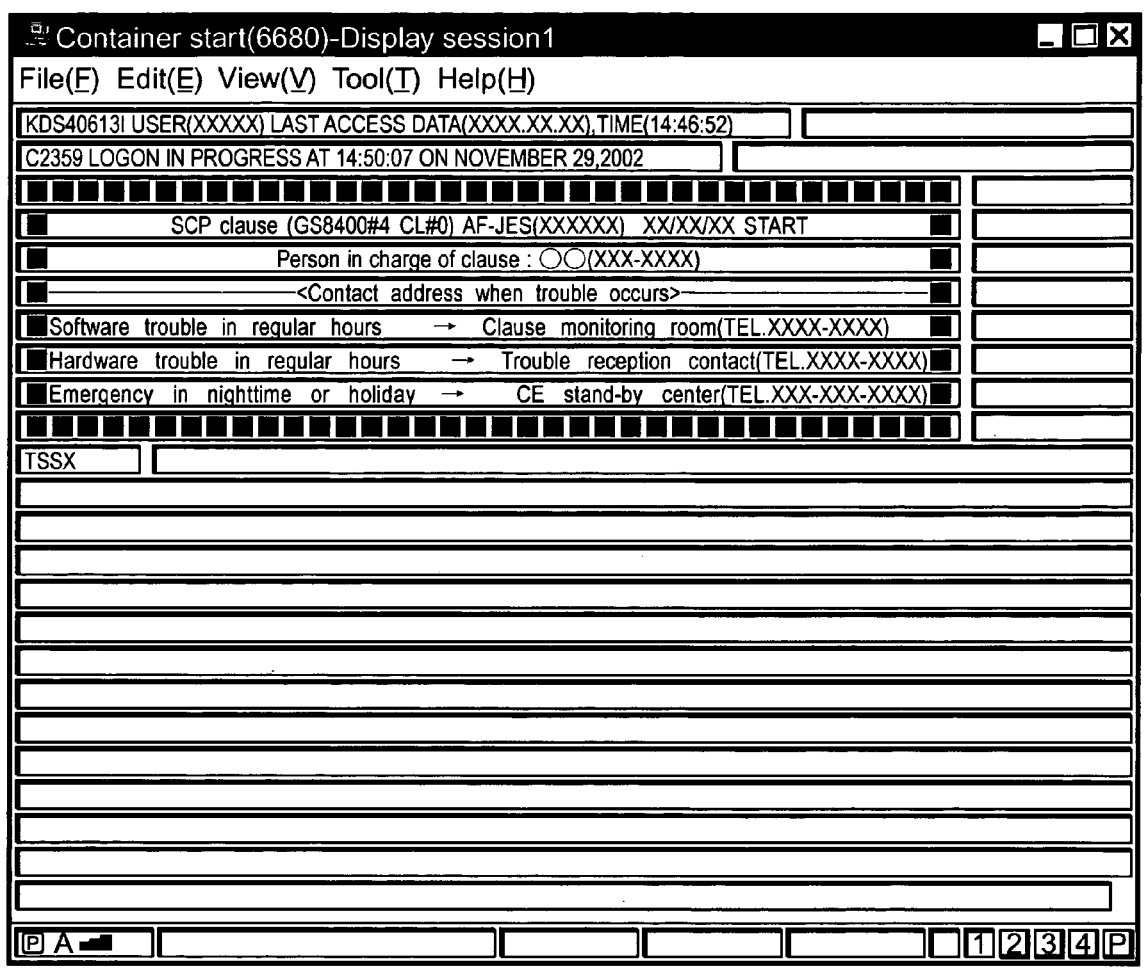
FIG. 11 shows one example of an initial GUI screen with unnecessary text boxes.
Figure 12:
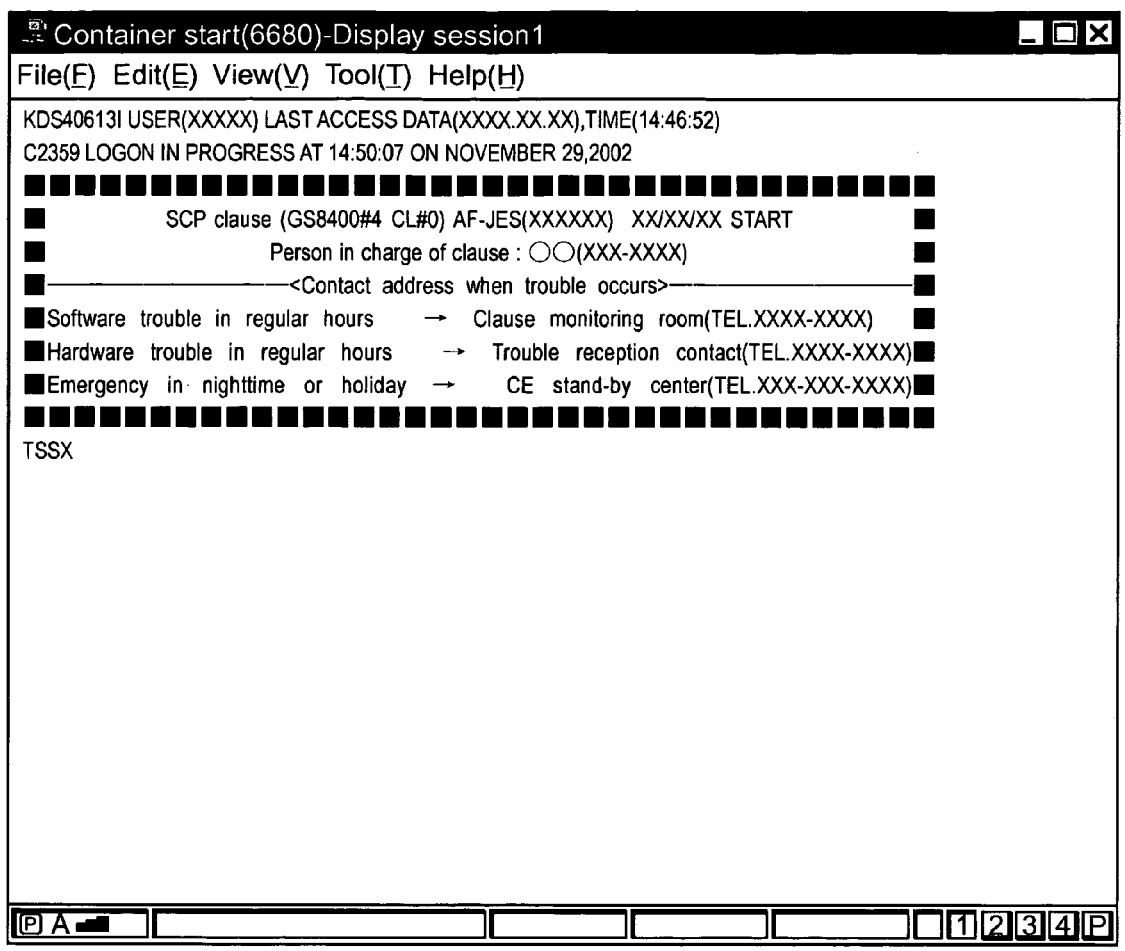
FIG. 12 shows one example of an initial GUI screen where all text boxes were deleted.

At S307, the CPU 10a changes the setting of the GUI screen data to delete all the text boxes. In addition, the host computer H transmits the CUI screen data for displaying the initial screen that has a host application name, an announcement or the like to the client computer 10 after the client computer 10 logs in the host computer H. The non-protecting field attribute is always set at the coordinate of the upper left corner in the CUI screen data for the initial screen. Moreover, although the non-protecting field attribute is set at some coordinates in the CUI screen data for the initial screen, the protecting field attribute is not set at any coordinates. Such a setting is common in every vender. Therefore, if the process at S307 is not executed, unnecessary text boxes will be displayed over the entire area of the initial screen as shown in FIG. 11 for example. On the other hand, when the process at S307 has been executed, a text box is not displayed on an initial screen as shown in FIG. 12, for example because all text boxes has been deleted. After the CPU 10a executed the process at S307, it finishes the text box correction subroutine, bringing the process to S203 of the GUI conversion subroutine in FIG. 5.

On the other hand, at S306, when the target coordinate was not coincident with (0, 0), the CPU 10a brings the process to S308.

At S308, the CPU 10a distinguishes whether the protecting field attribute corresponding to the non-protecting field attribute is set at coordinates following the target coordinate in the CUI screen data or not. When the protecting field attribute corresponding to the non-protecting field attribute is set at a coordinate in the CUI screen data, the CPU 10a brings the process to S309.

At S309, the CPU 10a distinguishes whether the non-protecting field between the coordinate having the non-protecting field attribute and the coordinate having the protecting field attribute occupies three or more lines. When the non-protecting field does not occupy three or more lines, the CPU 10a brings the process to S316. On the other hand, when the non-protecting field occupies three or more lines, the CPU 10a brings the process to S310.

At S310, the CPU 10a distinguishes whether the non-protecting field that occupies three or more lines is designated to be changed into a single line or into multi-line format. The designation is predetermined by an operator of the client computer 10. Then, the CPU 10a brings the process to S311 when the single line format is designated.

Figure 13:
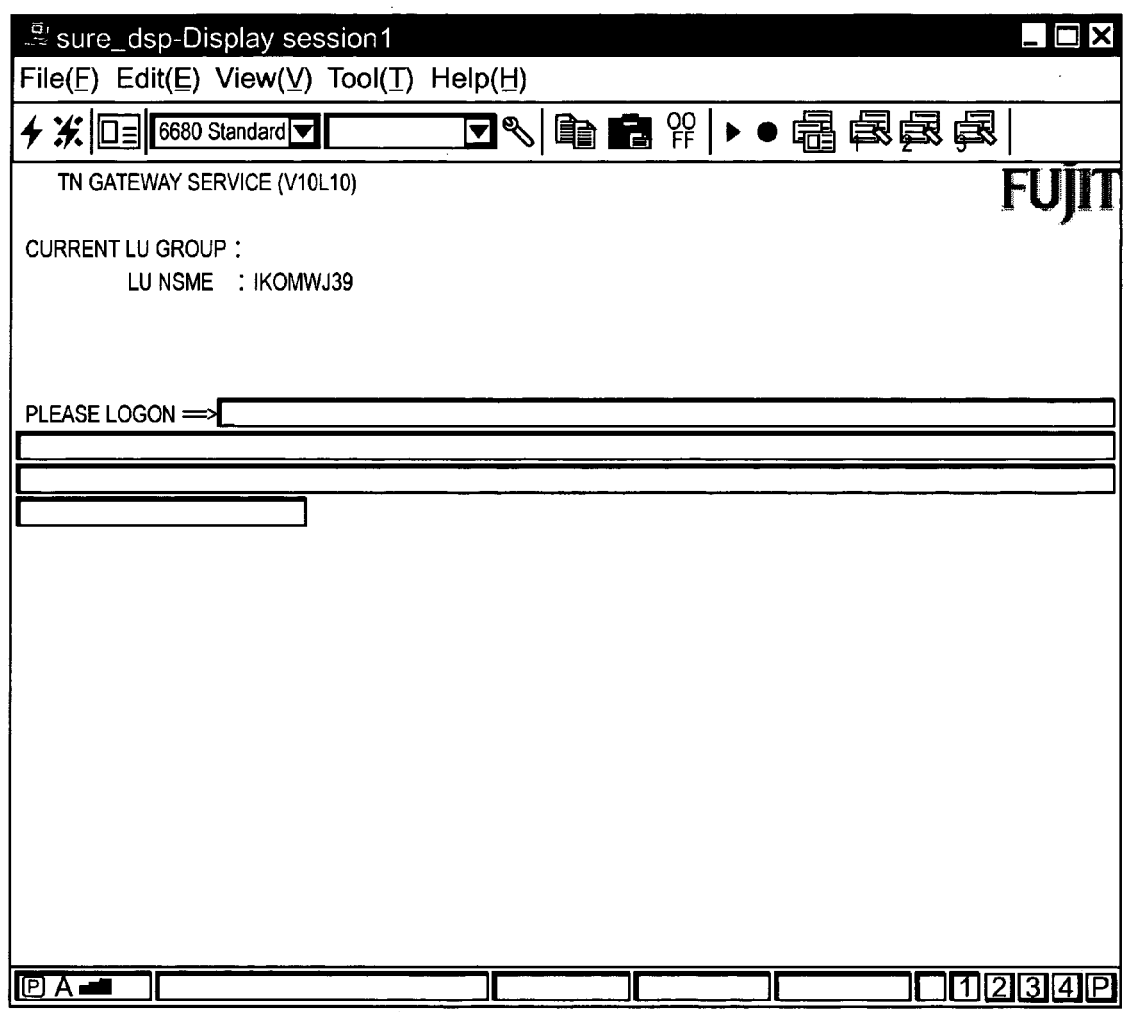
FIG. 13 shows one example of a GUI screen where a text box is displayed across four lines.
Figure 14:
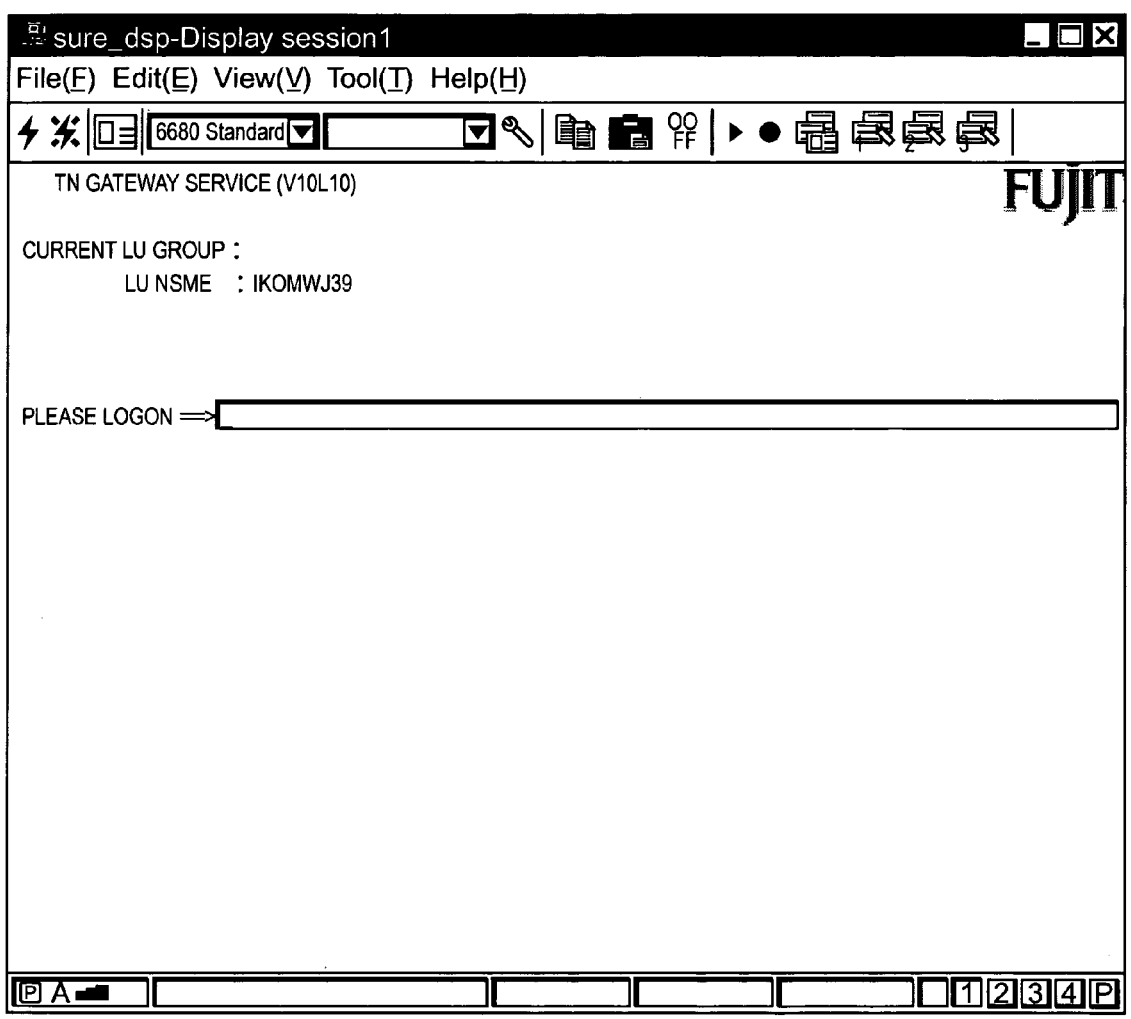
FIG. 14 shows one example of a GUI screen where a text box is displayed as a single line format.

At S311, the CPU 10a changes the setting of the GUI screen data so that the end of the text box whose start point is coincident with the target coordinate is set at the end of the line including the target coordinate. In addition, if the process at S311 is not executed, a text box is formed across four lines as shown in FIG. 13, for example. However, after the process at S311, the text box that was formed across four lines is converted into a single line and the end of the text box is positioned at the right end of the screen as shown in FIG. 14, for example. The CPU 10a brings the process to S316 after executing the process at S311.

On the other hand, the CPU 10a brings the process to S312 when the multi-line format is designated.

Figure 15:
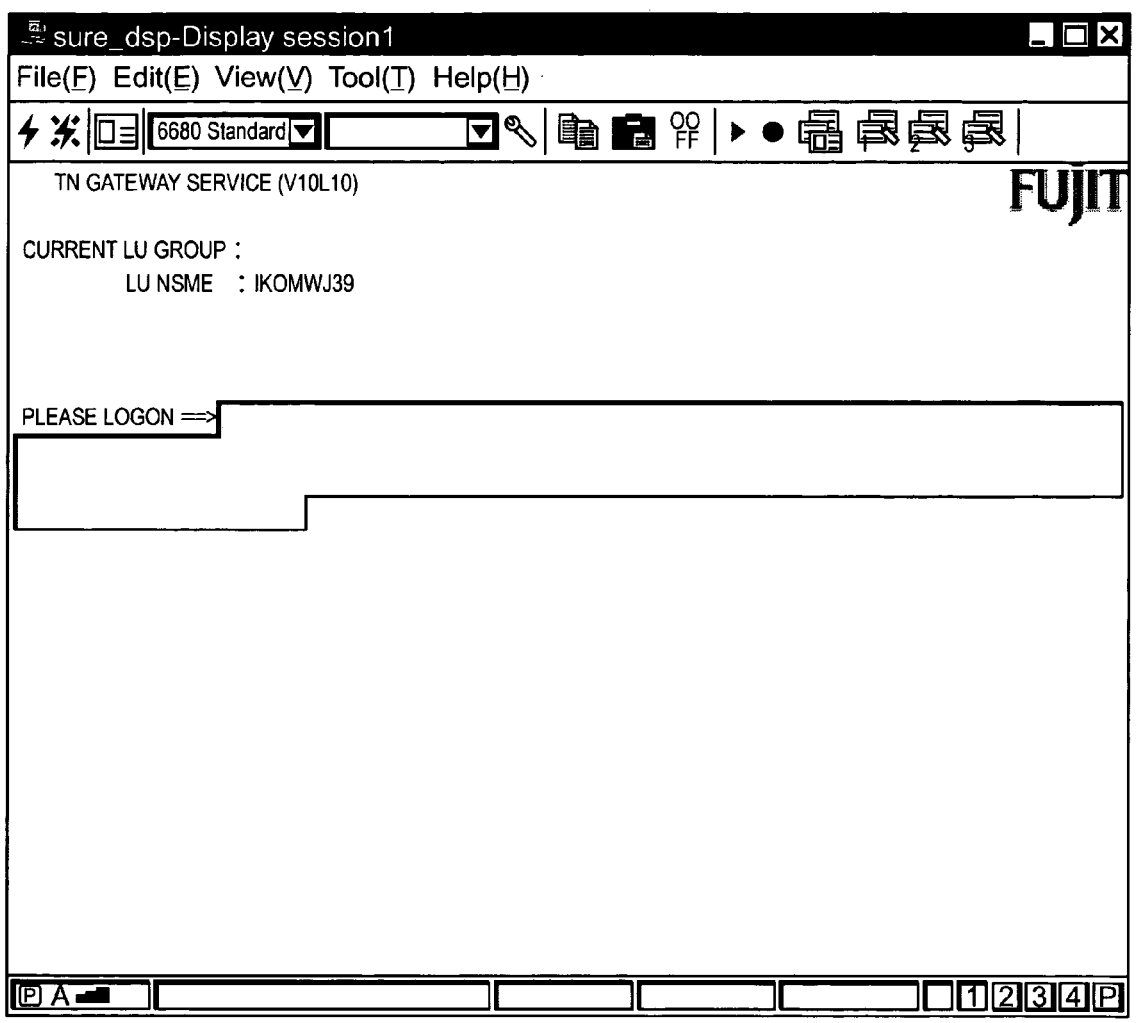
FIG. 15 shows one example of a GUI screen where a text box is displayed as a multi-line format.

At S312, the CPU 10a changes the setting of the GUI screen data so that the text box that occupies three or more lines is converted into a multi-line text box. In addition, if the process at S312 is not executed, a text box is formed as four blocks as shown in FIG. 13, for example. However, after the process at S312, the text box that was formed as four blocks is converted into a single block as a whole as shown in FIG. 15, for example. The CPU 10a brings the process to S316 after executing the process at S312.

Moreover, at S308, when the protecting field attribute corresponding to the non-protecting field attribute does not exist in the CUI screen data, the CPU 10a brings the process to S313.

At S313, the CPU 10a distinguishes whether a wrapping process has been designated in advance. The wrapping process makes a region of a predetermined attribute continue from the upper left corner of the screen when the end of the region is not set through the lower right corner of the screen. This designation is also predetermined by an operator of the client computer 10. Then the CPU 10a brings the process to S315 when the wrapping process is not designated. On the other hand, when the wrapping process is designated, the CPU 10a brings the process to S314.

Figure 16:
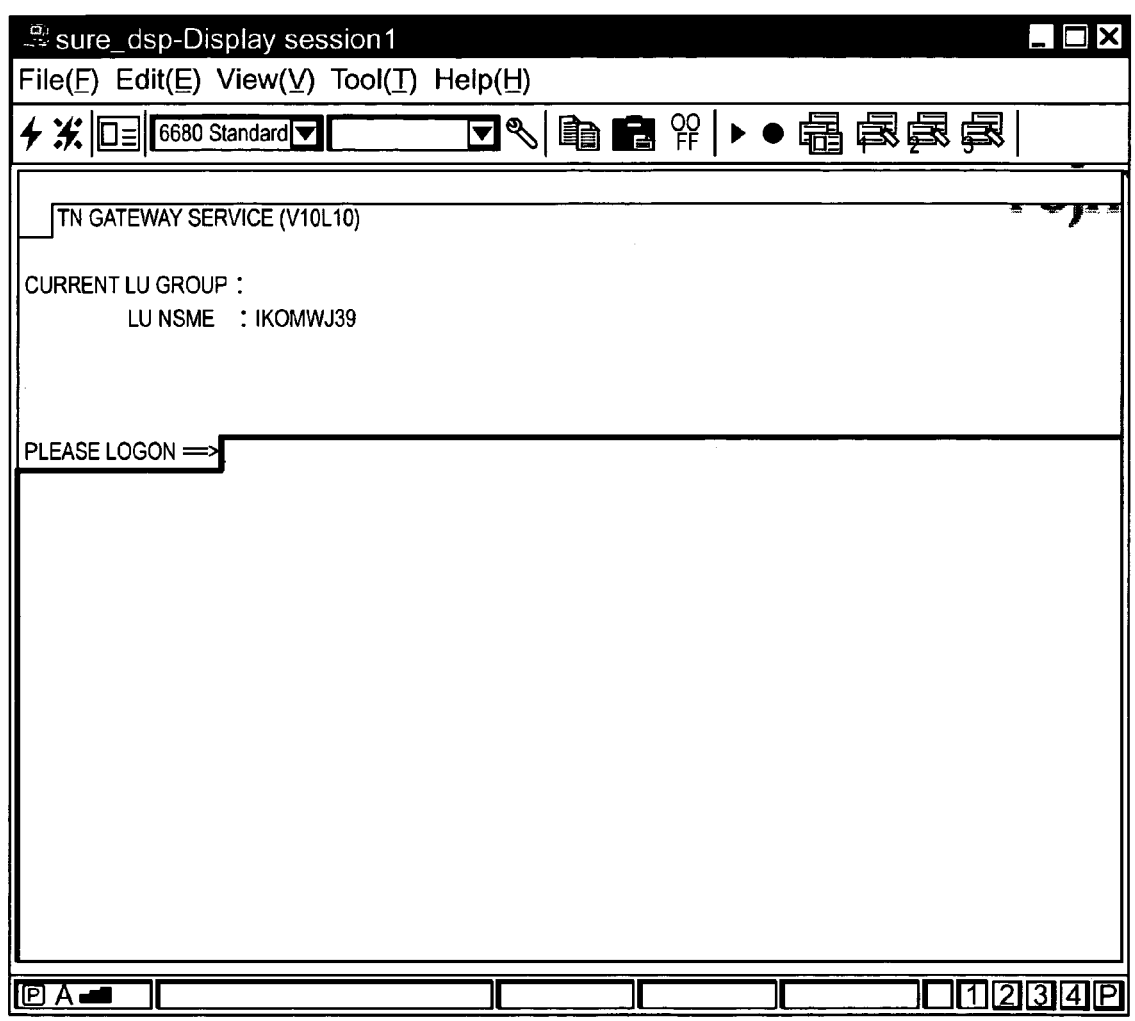
FIG. 16 shows one example of a GUI screen where a text box is displayed at the upper left corner.

At S314, the CPU 10a changes the setting of the GUI screen data so that the text box is not displayed in the region following the upper left corner in the screen. In addition, it the process at S314 is not executed, a text box is displayed in the region following the upper left corner in the screen as shown in FIG. 16, for example. On the other hand, after the process at S314, a text box will not be displayed in the region following the upper left corner in the screen as shown in FIG. 11, for example. The CPU 10a brings the process to S315 after executing the process at S314.

At S315, the CPU 10a changes the setting of the GUI screen data so that the text box will be a multi-line text box when the text box before the lower right corner of the screen occupies two or more lines. There, the CPU 10a brings the process to S316.

At S316, the CPU 10a distinguishes whether any unfinished coordinates exist in the CUI screen data. When there is an unfinished coordinate, the CPU 10a brings the process to S317.

At S317, the CPU 10a specifies the following target coordinate from the unfinished coordinates in the CUI screen data, returning the process to S304.

When all the coordinates in the CUI screen data are finished during the loop of S304 through S317, the CPU 10a branches the process at S316. Then, the CPU 10a finishes the text box correction subroutine, bringing the process to S203 in the GUI conversion subroutine of FIG. 5.

Figure 18:
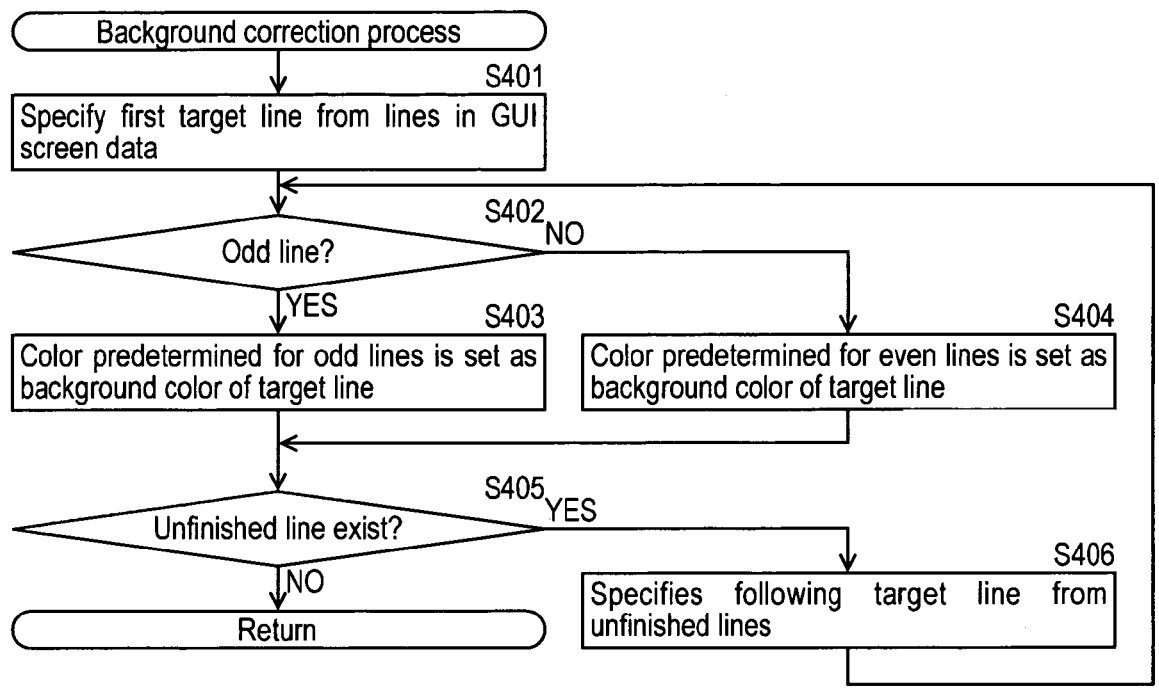
FIG. 18 is a flowchart showing contents of a background correction subroutine.

At S203, the CPU 10a executes a background correction subroutine. FIG. 18 is a flowchart showing the contents of the background correction subroutine.

At S401 of the background correction subroutine, the CPU 10a specifies a first target line from the lines in the GUI screen data.

Next, at S402, the CPU 10a distinguishes whether the target line is an odd line or not. Then, the CPU 10a brings the process to S403, when the target line is an odd line. At S403, the CPU 10a changes the setting of the GUI screen data so that a color predetermined for odd lines is set as the background color of the target line. Then, the CPU 10a brings the process to S405.

On the other hand, at S402, when the target line is an even line, the CPU 10a brings the process to S404. At S404, the CPU 10a changes the setting of the GUI screen data so that a color predetermined for even lines is set as the background color of the target line. Then, the CPU 10a brings the process to S405.

At S405, the CPU 10a distinguishes whether an unfinished line exists in the GUI screen data. When an unfinished line exists, the CPU 10a brings the process to S406. At S406, the CPU 10a specifies the following target line from the unfinished lines in the GUI screen data, returning the process to S402.

Figure 19:
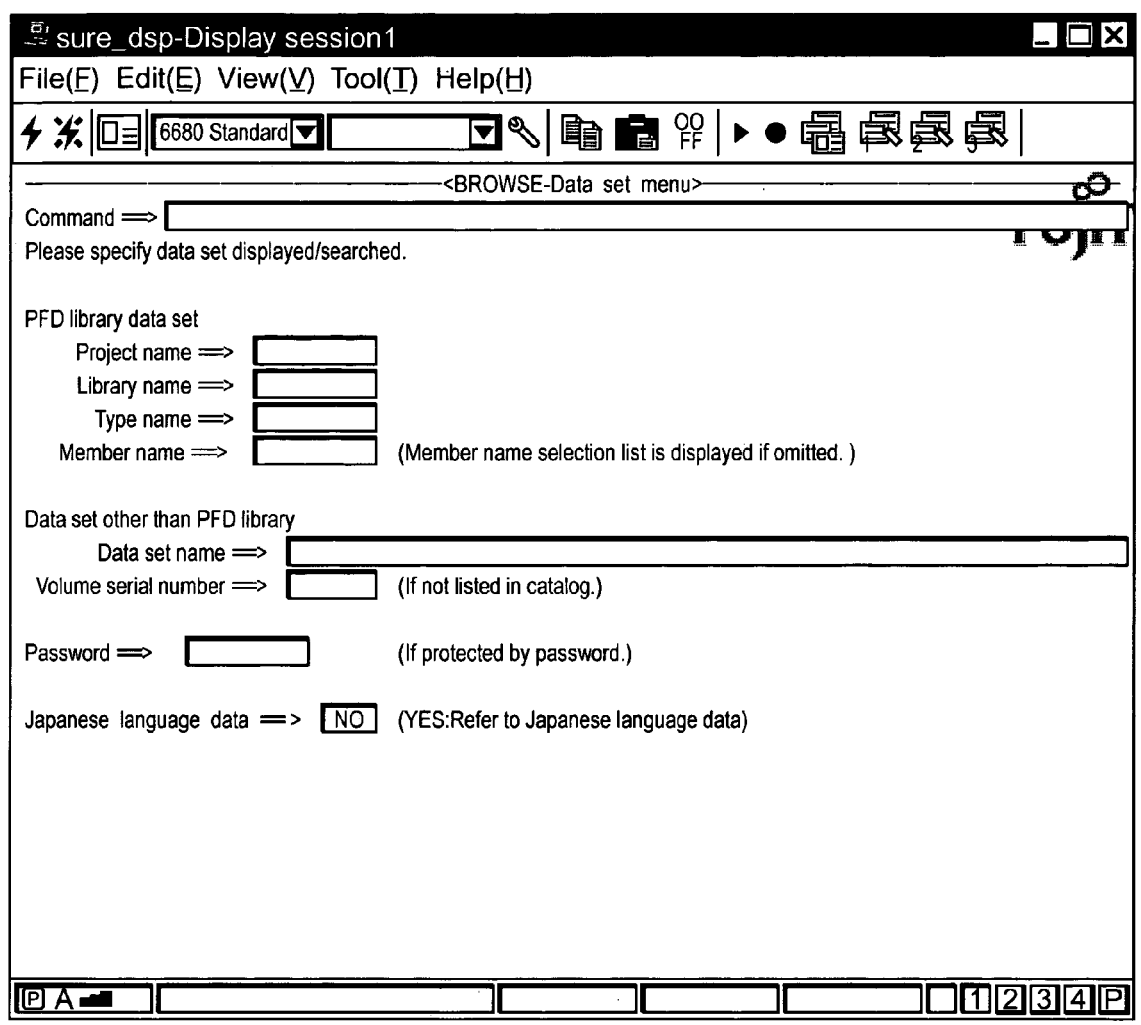
FIG. 19 shows one example of a GUI screen whose background has single color.
Figure 20:
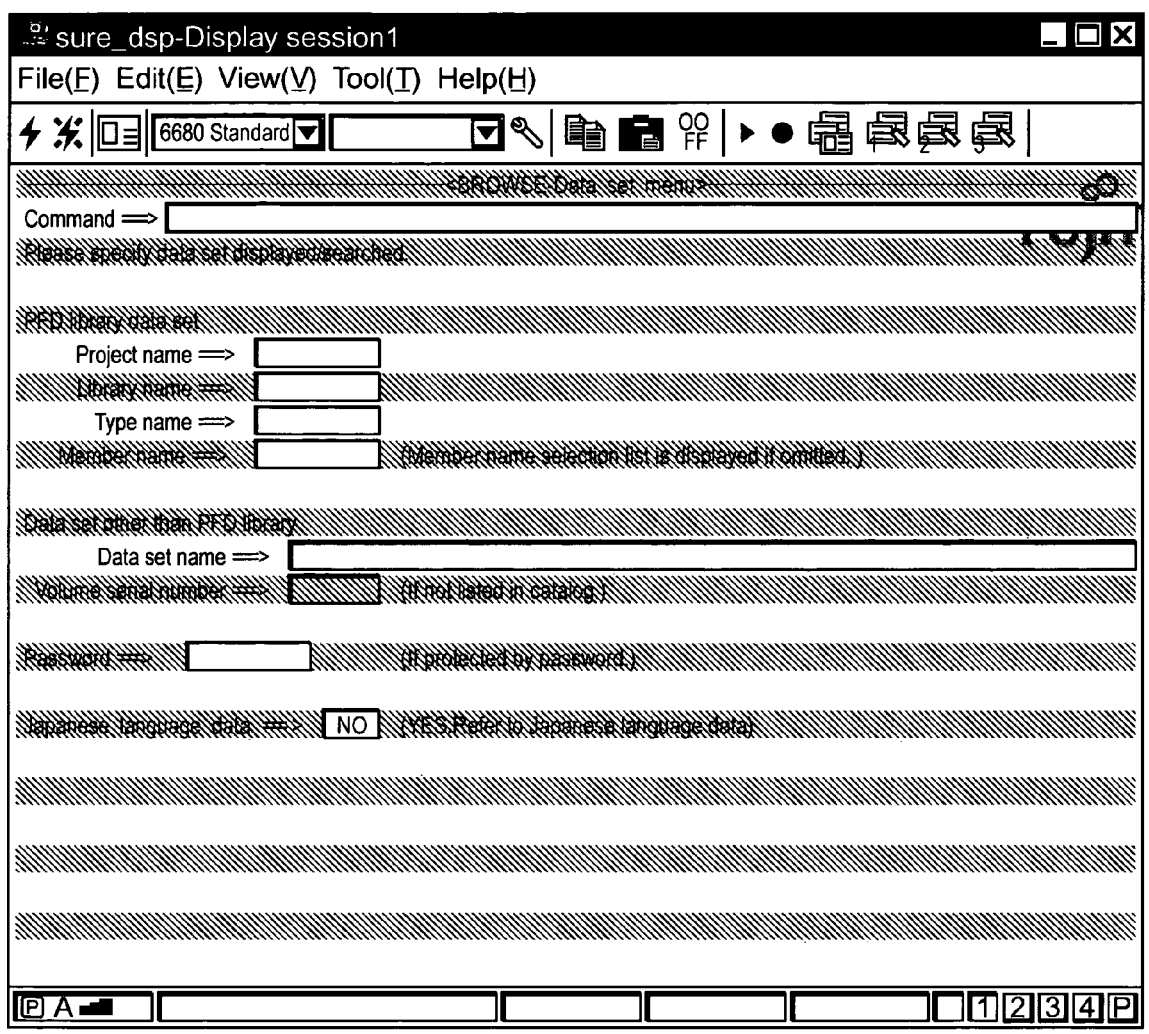
FIG. 20 shows one example of a GUI screen whose background has two colors forming horizontal stripes.

When all the lines in the GUI screen data are finished during the loop or S402 through S406, the CPU 10a branches the process at S405, finishing the background correction subroutine. If the GUI screen data is not processed in the background correction subroutine, the background becomes monotone as shown in FIG. 19, for example. On the other hand, after the background correction subroutine, the background of the odd lines and the background of the even lines are displayed in the different colors, respectively. FIG. 20 is a sample image of the screen processed by the background correction subroutine where the color of the odd lines is represented by hatching. The CPU 10a brings the process to S204 of the GUI conversion subroutine of FIG. 5 after executing the background correction process.

Figure 21:
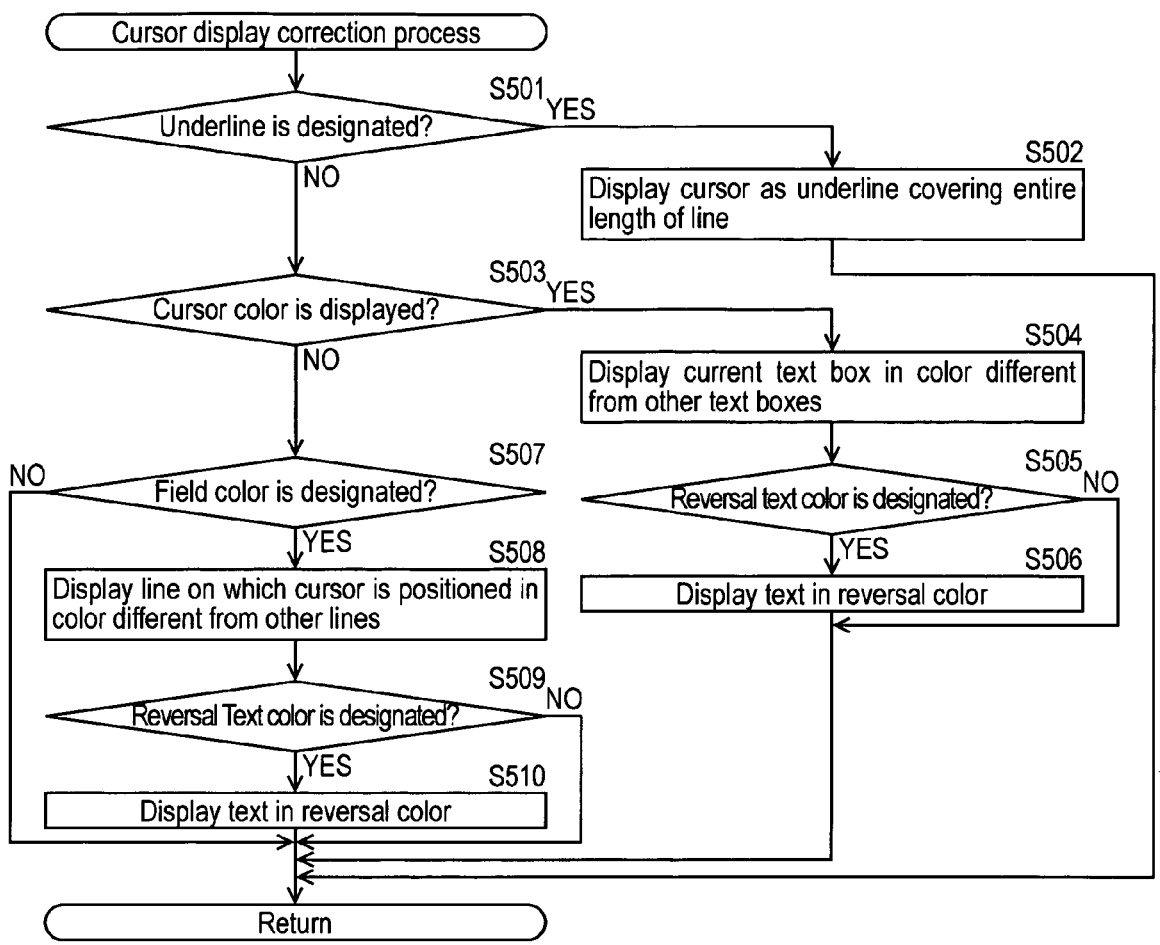
FIG. 21 is a flowchart showing contents of a cursor display correction subroutine.

At S204, the CPU 10a executes a cursor display correction subroutine. FIG. 21 is a flowchart showing the contents of the cursor display correction subroutine.

At S501 of the cursor display correction subroutine, the CPU 10a distinguishes whether the cursor is designated to be displayed as an underline covering the entire length of a line. The designation is predetermined by an operator of the client computer 10. When it is designated in such a manner, the CPU 10a brings the process to S502.

Figure 17:
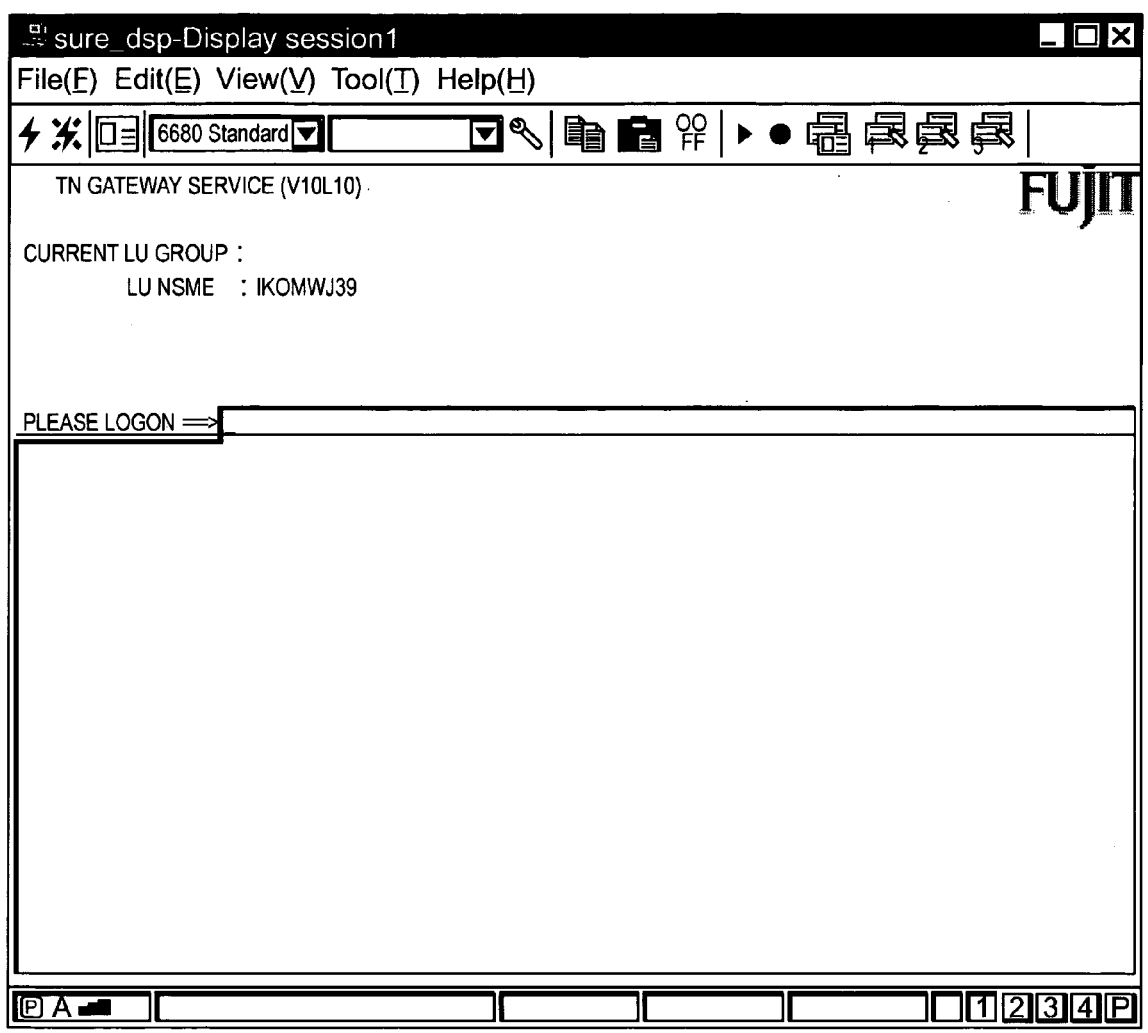
FIG. 17 shows one example of a GUI screen where the text box at the upper left corner has been deleted.

At S502, the CPU 10a changes the setting of the GUI screen data so that the cursor is displayed as an underline covering the entire length of a line. In addition, FIG. 17 shows one example of the screen displayed based on the GUI screen data changed at S502. The CPU 10a finishes the cursor display correction subroutine after executing the process at S502, bringing the process to S205 of the GUI conversion subroutine in FIG. 5.

On the other hand, when the cursor is not designated to be displayed as an underline covering the entire length of a line, the CPU 10a brings the process from S501 to S503.

At S503, the CPU 10a distinguishes whether the text box in which cursor is located (the current text box) is designated to be displayed in a color different from the other text boxes. The designation is predetermined by an operator of the client computer 10. When it is designated in such a manner, the CPU 10a brings the process to S504.

Figure 22:
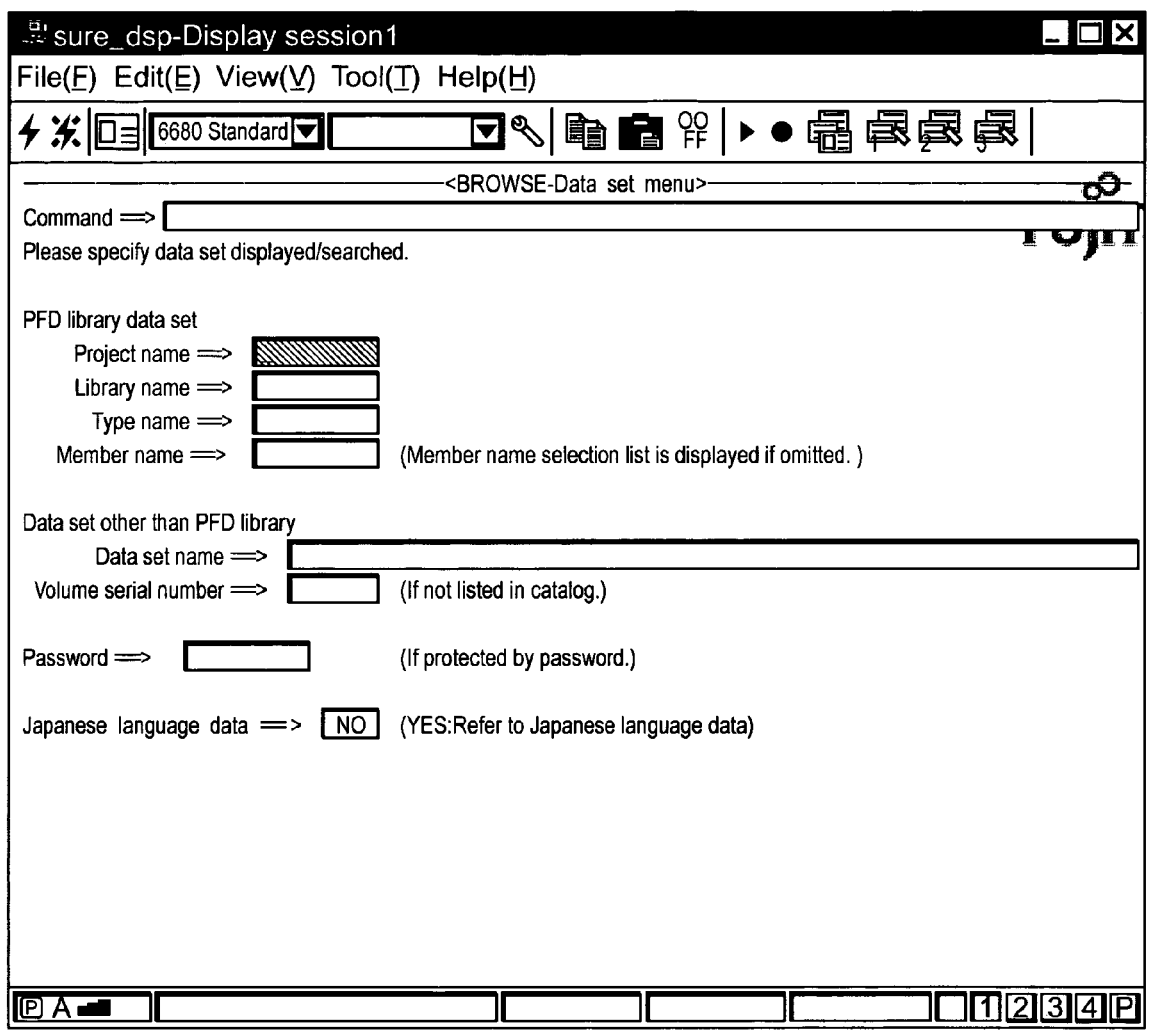
FIG. 22 shows one example of a GUI screen where a color inside the text box in which a cursor is positioned is reversal.

At S504, the CPU 10a changes the setting of the GUI screen data so that the current text box is displayed in the color different from the other text boxes. In addition, FIG. 22 is a sample image of the screen displayed based on the GUI screen data changed at S504 where the color of the current text box is represented by hatching. The CPU 10a brings the process to S505 after executing the process at S504.

At S505, the CPU 10a distinguishes whether a text in a text box is designated to be displayed in a color (reversal color) different from the color in the text box in which the cursor is positioned. When it is not designated in such a manner, the CPU 10a finishes the cursor display correction subroutine, bringing the process to S205 of the GUI conversion subroutine in FIG. 5. On the other hand, when the text is designated to be displayed in the reversal color, the CPU 10a brings the process to S506.

At S506, the CPU 10a changes the setting of the GUI screen data so that the attribute of the color of a text in a text box is set as the value representing the color (reversal color) different from the color of the current text box. Then, the CPU 10a finishes the cursor display correction subroutine after executing the process at S506, bringing the process to S205 of the GUI conversion subroutine in FIG. 5.

On the other hand, when the current text box is not designated to be displayed in the color different from the other text boxes, the CPU 10a brings the process from S503 to S507.

At S507, the CPU 10a distinguishes whether the line on which the cursor is positioned is designated to be displayed in a color different from the other lines. The designation is predetermined by an operator of the client computer 10. When it is not designated in such a manner, the CPU 10a finishes the cursor display correction subroutine, bringing the process to S205 of the GUI conversion subroutine in FIG. 5. On the other hand, when the line with the cursor is designated to be displayed in the color different from the other lines, the CPU 10a brings the process to S508.

Figure 23:
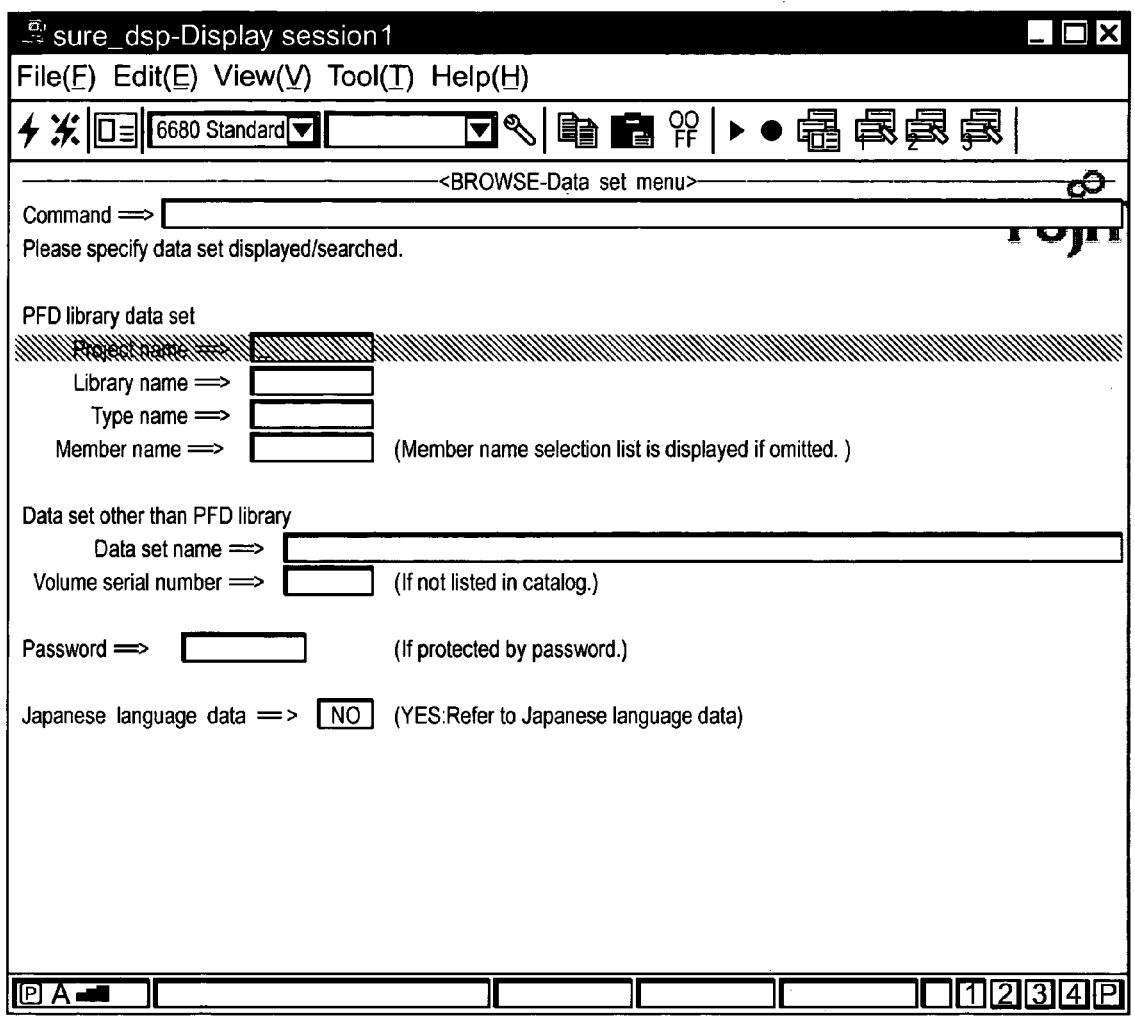
FIG. 23 shows one example of a GUI screen where a color of the line on which a cursor is positioned is reversal.

At S508, the CPU 10a changes the setting of the GUI screen data so that the line on which the cursor is positioned is displayed in the color different from the other lines. In addition, FIG. 23 is a sample image of a screen displayed based on the GUI screen data changed at S508 where the color of the line on which the cursor is positioned is represented by hatching. The CPU 10a brings the process to S509 after executing of the process at S508.

At S509, the CPU 10a distinguishes whether a text in a text box it is designated to be displayed in a color (reversal color) different from the color of the line on which the cursor is positioned. When it is not designated in such a manner, the CPU 10a finishes the cursor display correction subroutine, bringing the process to S205 of the GUI conversion subroutine in FIG. 5. On the other hand, when the text is designated to be displayed in the reversal color, the CPU 10a brings the process to S510.

At S510, the CPU 10a changes the setting of the GUI screen data so that the attribute of the color of a text in a text box is set as the value representing the color (reversal color) different from the color of the line on which the cursor is positioned. Then, the CPU 10a finishes the cursor display correction subroutine after executing the process at S510, bringing the process to S205 of the GUI conversion subroutine in FIG. 5.

Figure 24:
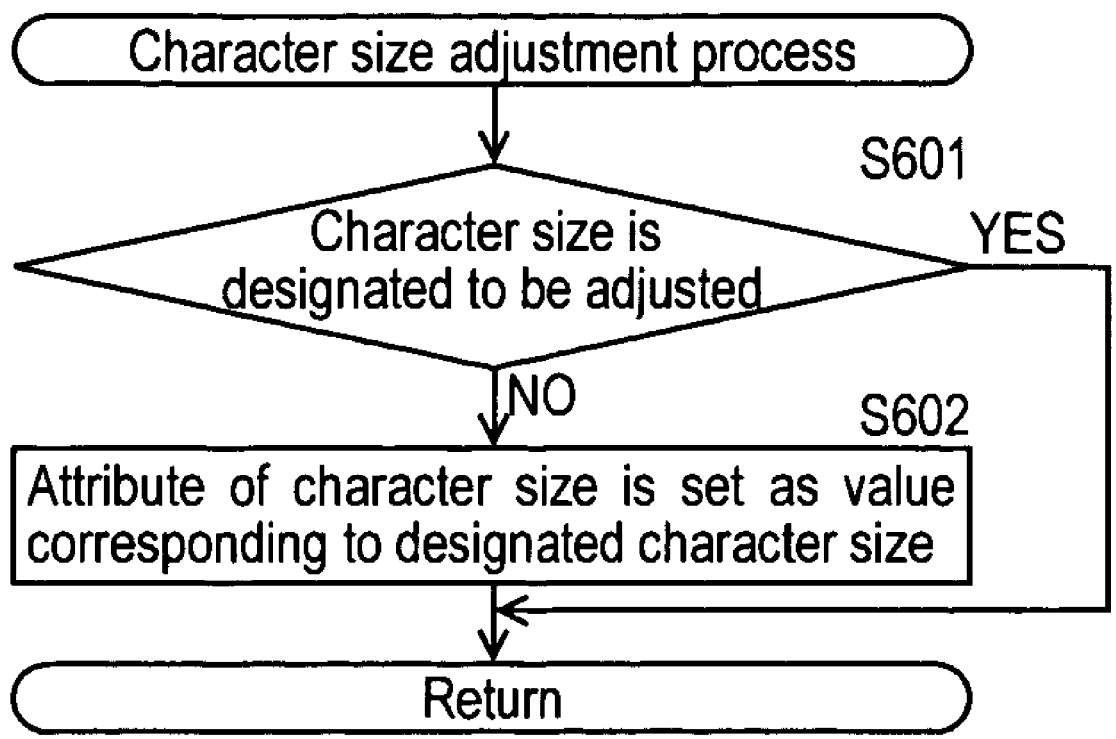
FIG. 24 is a flowchart showing contents of a character size adjustment subroutine.

At S205, the CPU 10a executes a character size adjustment subroutine. FIG. 24 is a flowchart showing the contents of the character size adjustment subroutine.

At S601 of the character size adjustment subroutine, the CPU 10a distinguishes whether the size of characters displayed in a text box is designated to be adjusted. The designation is predetermined by an operator of the client computer 10. When the character size is designated to be adjusted, the CPU 10a brings the process to S602.

At S602, the CPU 10a changes the setting of the GUI screen data so that the attribute of a size of characters displayed in a text box is set as the value corresponding to the designated character size. Then, the CPU 10a finishes the character size adjustment subroutine and the GUI conversion subroutine in FIG. 5, bringing the process to S106 of the main routine in FIG. 3.

On the other hand, when the character size is not designated to be adjusted at S601, the CPU 10a finishes the character size adjustment subroutine with keeping the size of characters displayed in a text box as a standard value. Then, the CPU 10a finishes the GUI conversion subroutine of FIG. 5, bringing the process to S106 in the main routine of FIG. 3.

At S106, the CPU 10a displays the screen on the monitor based on the GUI screen data generated at S105.

Next, at S107, the CPU 10a distinguishes whether all the points that should be updated in the screen have been updated. That is, the CPU 10a distinguishes whether the GUI conversion at S105 and the screen display at S106 have been finished with respect to all the points in the CUI screen data transmitted from the host computer H in response to a command. Then, the CPU 10a returns the process to S104, when a point that should be updated has not been updated. When all the points that should be updated have been updated, the CPU 10a brings the process to S108.

At S108, the CPU 10a stands by until the enter key in the above-mentioned input device is depressed. When the enter key is depressed, the CPU 10a brings the process to S109.

At S109, the CPU 10a distinguishes whether the command input in the screen at the time when the enter key is depressed is an end command. Then, the CPU 10a brings the process to S110, when the command input in the screen is not an end command.

At S110, the CPU 10a transmits the input command to the host computer H, returning the process back to S104.

On the other hand, at S109, when the input command is an end command, the CPU 10a brings the process to S111.

At S111, the CPU 10a transmits an end command to the host computer H, finishing the terminal emulating process.

Since the above host terminal emulating process is executed according to the embodiment, the following effects are acquired.

(1) According to the conventional method, since a text box is not formed at the cursor position when a GUI screen is displayed based on CUI screen data transmitted from the host computer H only for changing the initial position of a cursor, an operator of the client computer 10 might mistake the position on which a command should be input (see FIG. 9). On the contrary, according to the embodiment, since the initial position attribute of a cursor is set as the first coordinate in the CUI screen data, the text box whose start point is positioned at the initial position of the cursor is set in a GUI screen. Therefore, an operator can recognize a command input position correctly with the text box shown in the GUI screen (see FIG. 10).

(2) According to the conventional method, when CUI screen data for an initial screen transmitted from the host computer H is converted to GUI screen data, text boxes are displayed over the entire area of the initial GUI screen, which reduces visibility of the GUI screen (see FIG. 11). On the contrary, according to the embodiment, text boxes set up in the GUI screen data are deleted in response to the fact that the non-protecting field attribute is set at the coordinate of the upper left corner in the CUI screen data. Therefore, an initial screen based on the GUI screen data is easy to see for an operator of the client computer 10 (see FIG. 12).

(3) According to the conventional method, when the CUI screen data in which the non-protecting field occupies three or more lines is converted into GUI screen data, text boxes divided into three ore more blocks are displayed in the GUI screen. Therefore, the GUI screen is difficult to see for an operator of the client computer 10 (see FIG. 13). On the contrary, according to the embodiment, text box set in GUI screen data is changed into a single line or into multi-line format based on a designation by an operator. Therefore, the GUI screen is easy to see for an operator (see FIGS. 14 and 15).

(4) According to the conventional method, when CUI screen data in which a protecting field attribute corresponding to a non-protecting field attribute is not set is transmitted from the host computer H and the wrapping process is set to execute, a text box is displayed in the region following the upper left corner (see FIG. 16). On the contrary, according to the embodiment, a text box set in the region following the upper left corner in GUI screen data is deleted when the wrapping process is set to execute. Therefore, a text box displayed on the GUI screen is easy to see for an operator (see FIG. 17).

(5) According to the embodiment, since the GUI screen data is set so that the background color of the odd lines are different from that of the even lines, an operator can easily recognize a line on a GUI screen (see FIG. 20).

(6) According to the embodiment, an operator can change a setting of GUI screen data to display a cursor as an underline covering the entire length of a line, or to display a text box in which a cursor is positioned in a color different from the other text boxes, or to display a text box with a cursor in a color different from its background color. Therefore, an operator can easily find a position of a cursor on a GUI screen (see FIGS. 17, 22 and 23).

(7) According to the embodiment, an operator can change a setting of GUI screen data to display a text in a text box in which a cursor is positioned in a color different from a color of the cursor by changing a color in the text box or by changing a color of a line. Therefore, an operator can easily recognize a text input at a position of a cursor.

(8) According to the embodiment, an operator can change a setting of GUI screen data to adjust a character size of a text in a text box. Therefore, the character size of a text in a text box can be reduced to prevent overlap between a text and a frame of a text box on a GUI screen, for example.

As described above, according to the present invention, GUI screen data on which GUI parts are appropriately displayed can be generated on the precondition that parts in a CUI screen are replaced by GUI parts one by one.

What is claimed is:

1. A host terminal emulation program that operates a client computer, a monitor being connected to the client computer for displaying screens and a communication control unit being connected to the client computer for transmitting/receiving data to/from a host computer, said emulation program causing the client computer to perform the steps of:

detecting a coordinate at which a predetermined first attribute is set from coordinates, characters and attributes in character user interface (CUI) screen data generated in said host computer when said communication control unit receives CUI screen data from said host computer;

generating graphical user interface (GUI) screen data in which GUI parts corresponding to said first attribute are set at respective coordinates following the detected coordinate;

correcting, when the coordinate at which said first attribute is set represents the upper left corner of the screen, said GUI screen data with reference to the coordinate at which said first attribute is set by deleting said GUI parts; and displaying a screen based on the corrected GUI screen data on said monitor.

2. A host terminal emulation program that operates a client computer, a monitor being connected to the client computer for displaying screens and a communication control unit being connected to the client computer for transmitting/receiving data to/from a host computer, said emulation program causing the client computer to perform the steps of:

detecting a coordinate at which a predetermined first attribute is set from coordinates, characters and attributes in character user interface (CUI) screen data generated in said host computer when said communication control unit receives CUI screen data from said host computer;

generating graphical user interface (GUI) screen data in which GUI parts corresponding to said first attribute are set at respective coordinates following the coordinate at which said first attribute is set;

detecting a coordinate at which a second attribute corresponding to said first attribute is set from coordinates in said CUI screen data;

correcting, when a coordinate at which said second attribute is set is detected and a line including the coordinate at which said second attribute is set is separated three or more lines from the line including the coordinate at which the first attribute is set, the GUI screen data with reference to the coordinate at which said second attribute is set by reforming said GUI parts; and displaying a screen based on the corrected GUI screen data on said monitor.

3. A host terminal emulation method running on a client computer that transmits/receives data to/from a host computer, said emulation method comprising steps of:

detecting a coordinate at which a predetermined first attribute is set from coordinates, characters and attributes in character user interface (CUI) screen data generated in said host computer when CUI screen data is received from said host computer;

generating GUI screen data in which graphical user interface (GUI) parts corresponding to said first attribute are set at respective coordinates following the detected coordinate;

correcting, when the coordinate at which said first attribute is set represents the upper left corner of the screen, said GUI screen data with reference to the coordinate at which said first attribute is set by deleting said GUI parts; and displaying a screen based on the corrected GUI screen data on a monitor.

4. A host terminal emulation method running on a client computer that transmits/receives data to/from a host computer, said emulation method comprising steps of:

detecting a coordinate at which a predetermined first attribute is set from coordinates, characters and attributes in character user interface (CUI) screen data generated in said host computer when CUI screen data is received from said host computer;

generating graphical user interface (GUI) screen data in which parts corresponding to said first attribute are set at respective coordinates following the coordinate at which said first attribute is set;

detecting a coordinate at which a second attribute corresponding to said first attribute is set from coordinates in said CUI screen data;

correcting, when a coordinate at which said second attribute is set is detected and a line including the coordinate at which said second attribute is set is separated three or more lines from the line including the coordinate at which the first attribute is set, the GUI screen data with reference to the coordinate at which said second attribute is set by reforming said GUI parts; and displaying a screen based on the corrected GUI screen data on a monitor.

5. A computer-readable medium that contains a host terminal emulation program that operates a client computer, a monitor being connected to the client computer for displaying screens, and a communication control unit being connected to the client computer for transmitting/receiving data to/from a host computer, said emulation program causing the client computer to perform the steps of:

detecting a coordinate at which a predetermined first attribute is set from coordinates, characters and attributes in character user interface (CUI) screen data generated in said host computer when said communication control unit receives CUI screen data from said host computer;

generating graphical user interface (GUI) screen data in which GUI parts corresponding to said first attribute are set at respective coordinates following the detected coordinate;

correcting, when the coordinate at which said first attribute is set represents the upper left corner of the screen, said GUI screen data with reference to the coordinate at which said first attribute is set by deleting said GUI parts; and displaying a screen based on the corrected GUI screen data on said monitor.

6. A computer-readable medium that contains a host terminal emulation program that operates a client computer, a monitor being connected to the client computer for displaying screens and a communication control unit being connected to the client computer for transmitting/receiving data to/from a host computer, said emulation program causing the client computer to perform the steps of:

detecting a coordinate at which a predetermined first attribute is set from coordinates, characters and attributes in character user interface (CUI) screen data generated in said host computer when said communication control unit receives CUI screen data from said host computer;

generating graphical user interface (GUI) screen data in which GUI parts corresponding to said first attribute are set at respective coordinates following the coordinate at which said first attribute is set;

detecting a coordinate at which a second attribute corresponding to said first attribute is set from coordinates in said CUI screen data;

correcting, when a coordinate at which said second attribute is set is detected and a line including the coordinate at which said second attribute is set is separated three or more lines from the line including the coordinate at which the first attribute is set, the GUI screen data with reference to the coordinate at which said second attribute is set by reforming said GUI parts; and displaying a screen based on the corrected GUI screen data on said monitor.

* * * * *

UNITED STATES PATENT AND TRADEMARK OFFICE
CERTIFICATE OF CORRECTION

| | | |
|---|---|---|
| PATENT NO. | : 7,523,025 B2 | Page 1 of 1 |
| APPLICATION NO. | : 10/731974 | |
| DATED | : April 21, 2009 | |
| INVENTOR(S) | : Masushige et al. | |

It is certified that error appears in the above-identified patent and that said Letters Patent is hereby corrected as shown below:

On the Title Page:

beneath:

Item (22) Filed:    December 10, 2008

Please insert:

-- (30)   Foreign Application Priority Data
      Dec. 10, 2002 (JP) ............................... 2002-358569 --

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,523,025 B2 | Page 1 of 1 |
| APPLICATION NO. | : 10/731974 | |
| DATED | : April 21, 2009 | |
| INVENTOR(S) | : Masushige et al. | |

It is certified that error appears in the above-identified patent and that said Letters Patent is hereby corrected as shown below:

On the Title Page:

Please insert:

-- (30) Foreign Application Priority Data
    Dec. 10, 2002 (JP) ............................... 2002-358569 --

This certificate supersedes the Certificate of Correction issued August 4, 2009.

Signed and Sealed this
Twenty-second Day of February, 2011

David J. Kappos
*Director of the United States Patent and Trademark Office*